United States Patent
Koponen et al.

(10) Patent No.: US 10,033,579 B2
(45) Date of Patent: Jul. 24, 2018

(54) USING TRANSACTIONS TO COMPUTE AND PROPAGATE NETWORK FORWARDING STATE

(71) Applicant: Nicira, Inc., Palo Alto, CA (US)

(72) Inventors: Teemu Koponen, San Francisco, CA (US); Amar Padmanabhan, Menlo Park, CA (US)

(73) Assignee: NICIRA, INC., Palo Alto, CA (US)

( * ) Notice: Subject to any disclaimer, the term of this patent is extended or adjusted under 35 U.S.C. 154(b) by 36 days.

(21) Appl. No.: 15/068,473

(22) Filed: Mar. 11, 2016

(65) Prior Publication Data
US 2016/0197774 A1 Jul. 7, 2016

Related U.S. Application Data

(63) Continuation of application No. 14/348,885, filed as application No. PCT/US2013/037231 on Apr. 18, 2013, now Pat. No. 9,306,843.
(Continued)

(51) Int. Cl.
*H04L 12/24* (2006.01)
*H04L 12/715* (2013.01)
(Continued)

(52) U.S. Cl.
CPC ...... *H04L 41/0803* (2013.01); *G06F 9/45558* (2013.01); *H04L 41/0654* (2013.01);
(Continued)

(58) Field of Classification Search
CPC . H04L 12/24; H04L 41/0654; H04L 41/0803; H04L 41/0893; H04L 43/0823;
(Continued)

(56) References Cited

U.S. PATENT DOCUMENTS

| 5,426,774 A | 6/1995 | Banerjee et al. |
| 5,504,921 A | 4/1996 | Dev et al. |

(Continued)

FOREIGN PATENT DOCUMENTS

| AU | 2012328697 A1 | 4/2014 |
| AU | 2012328699 | 4/2014 |

(Continued)

OTHER PUBLICATIONS

Portions of prosecution history of AU2013249151, Nov. 25, 2015 (mailing date), Nicira, Inc.
(Continued)

*Primary Examiner* — Tri H Phan
(74) *Attorney, Agent, or Firm* — Adeli LLP

(57) ABSTRACT

For a controller for managing a network comprising several managed forwarding elements that forward data in the network, a method for configuring a managed forwarding element is described. The method generates a first set of flow entries for defining forwarding behaviors of the managed forwarding element based on a current network policy for a logical network implemented in the several managed forwarding elements. The method sends the first set of flow entries to the managed forwarding element in order for the managed forwarding element to forward data that the managed forwarding element directly receives from an end machine based on the current network policy. The method generates a second set of flow entries for modifying forwarding behaviors of the managed forwarding element based on a new network policy for the logical network. The method sends the second set of flow entries to the managed forwarding element in order for the managed forwarding element to forward the data based on the new network policy.

20 Claims, 14 Drawing Sheets

Related U.S. Application Data

(60) Provisional application No. 61/635,056, filed on Apr. 18, 2012, provisional application No. 61/635,226, filed on Apr. 18, 2012, provisional application No. 61/647,516, filed on May 16, 2012, provisional application No. 61/684,693, filed on Aug. 17, 2012.

(51) Int. Cl.
*H04L 12/721* (2013.01)
*H04L 12/26* (2006.01)
*G06F 9/455* (2018.01)
*H04L 12/931* (2013.01)
*H04L 12/751* (2013.01)

(52) U.S. Cl.
CPC ...... *H04L 41/0893* (2013.01); *H04L 43/0823* (2013.01); *H04L 45/64* (2013.01); *H04L 45/72* (2013.01); *G06F 2009/4557* (2013.01); *H04L 45/02* (2013.01); *H04L 49/70* (2013.01)

(58) Field of Classification Search
CPC ......... H04L 45/02; H04L 45/64; H04L 45/72; H04L 49/70; G06F 9/45558; G06F 2009/4557
See application file for complete search history.

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |
| 6,055,243 A | 4/2000 | Vincent et al. |
| 6,104,699 A | 8/2000 | Holender et al. |
| 6,219,699 B1 | 4/2001 | McCloghrie et al. |
| 6,366,582 B1 | 4/2002 | Nishikado et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,042,912 B2 | 5/2006 | Ashwood Smith et al. |
| 7,046,630 B2 | 5/2006 | Abe et al. |
| 7,096,228 B2 | 8/2006 | Theimer et al. |
| 7,120,728 B2 | 10/2006 | Krakirian et al. |
| 7,126,923 B1 | 10/2006 | Yang et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,359,971 B2 | 4/2008 | Jorgensen |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,903,666 B1 | 3/2011 | Kumar et al. |
| 7,929,424 B2 | 4/2011 | Kochhar et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 8/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,060,875 B1 | 11/2011 | Lambeth et al. |
| 8,068,408 B2 * | 11/2011 | Ansari ............... H04L 45/00 370/216 |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,239,572 B1 | 8/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,321,561 B2 | 11/2012 | Fujita et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,578,003 B2 | 11/2013 | Brandwine et al. |
| 8,605,734 B2 | 12/2013 | Ichino |
| 8,612,627 B1 | 12/2013 | Brandwine |
| 8,621,058 B2 | 12/2013 | Eswaran et al. |
| 8,644,188 B1 | 2/2014 | Brandwine et al. |
| 8,705,513 B2 | 4/2014 | Van Der Merwe et al. |
| 8,750,288 B2 * | 6/2014 | Nakil .................. G06N 99/005 370/351 |
| 8,762,501 B2 | 6/2014 | Kempf et al. |
| 8,958,298 B2 | 2/2015 | Zhang et al. |
| 8,959,215 B2 | 2/2015 | Koponen et al. |
| 9,007,903 B2 | 4/2015 | Koponen et al. |
| 9,083,609 B2 | 7/2015 | Casado et al. |
| 9,124,538 B2 | 9/2015 | Koponen et al. |
| 9,137,102 B1 * | 9/2015 | Miller ................. H04L 12/6418 |
| 9,137,107 B2 | 9/2015 | Koponen et al. |
| 9,154,433 B2 | 10/2015 | Koponen et al. |
| 9,172,603 B2 | 10/2015 | Padmanabhan et al. |
| 9,178,833 B2 * | 11/2015 | Koponen ............ G06F 9/45558 |
| 9,203,701 B2 | 12/2015 | Koponen et al. |
| 9,253,109 B2 | 2/2016 | Koponen et al. |
| 9,306,843 B2 * | 4/2016 | Koponen ............ G06F 9/45558 |
| 9,319,337 B2 * | 4/2016 | Koponen ............... G05B 11/01 |
| 9,319,338 B2 * | 4/2016 | Padmanabhan ........ G05B 11/01 |
| 9,331,937 B2 * | 5/2016 | Koponen ................ H04L 45/64 |
| 9,391,880 B2 | 7/2016 | Koide |
| 9,602,421 B2 | 3/2017 | Koponen et al. |
| 9,722,871 B2 * | 8/2017 | Miller ................. H04L 41/0816 |
| 9,838,336 B2 * | 12/2017 | Koide .................... H04L 49/15 |
| 9,843,476 B2 | 12/2017 | Koponen et al. |
| 2001/0043614 A1 | 11/2001 | Viswanadham et al. |
| 2001/0044825 A1 | 11/2001 | Barritz |
| 2002/0034189 A1 | 3/2002 | Haddock et al. |
| 2002/0093952 A1 | 7/2002 | Gonda |

(56) References Cited

U.S. PATENT DOCUMENTS

| | | |
|---|---|---|
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2003/0204768 A1 | 10/2003 | Fee |
| 2003/0233385 A1 | 12/2003 | Srinivasa et al. |
| 2004/0044773 A1 | 3/2004 | Bayus et al. |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0101274 A1 | 5/2004 | Foisy et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0147095 A1 | 7/2005 | Guerrero et al. |
| 2005/0220096 A1 | 10/2005 | Friskney et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0028999 A1 | 2/2006 | Iakobashvili et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0182033 A1 | 8/2006 | Chen et al. |
| 2006/0182037 A1 | 8/2006 | Chen et al. |
| 2006/0184937 A1 | 8/2006 | Abels et al. |
| 2006/0193266 A1 | 8/2006 | Siddha et al. |
| 2006/0221961 A1 | 10/2006 | Basso et al. |
| 2007/0005627 A1 | 1/2007 | Dodge |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0239987 A1 | 10/2007 | Hoole et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0133687 A1 | 6/2008 | Fok et al. |
| 2008/0159301 A1 | 7/2008 | de Heer |
| 2008/0163207 A1 | 7/2008 | Reumann et al. |
| 2008/0165704 A1 | 7/2008 | Marchetti et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0031041 A1 | 1/2009 | Clemmensen |
| 2009/0043823 A1 | 2/2009 | Iftode et al. |
| 2009/0070501 A1 | 3/2009 | Kobayashi |
| 2009/0083445 A1 | 3/2009 | Ganga et al. |
| 2009/0113031 A1 | 4/2009 | Ruan et al. |
| 2009/0122710 A1 | 5/2009 | Bar-Tor et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0245793 A1 | 10/2009 | Chiang |
| 2009/0249470 A1 | 10/2009 | Litvin et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0279549 A1 | 11/2009 | Ramanathan et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046530 A1 | 2/2010 | Hautakorpi et al. |
| 2010/0046531 A1 | 2/2010 | Louati et al. |
| 2010/0058106 A1 | 3/2010 | Srinivasan et al. |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0191848 A1 | 7/2010 | Fujita et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage et al. |
| 2011/0032830 A1 | 2/2011 | Van Der Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0173490 A1 | 7/2011 | Narayanaswamy et al. |
| 2011/0261825 A1 | 10/2011 | Ichino |
| 2011/0273988 A1 | 11/2011 | Tourrilhes et al. |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0310899 A1 | 12/2011 | Alkhatib et al. |
| 2011/0317559 A1 | 12/2011 | Kern et al. |
| 2011/0317701 A1 | 12/2011 | Yamato et al. |
| 2012/0014386 A1 | 1/2012 | Xiong et al. |
| 2012/0147894 A1 | 6/2012 | Mulligan et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0044636 A1 | 2/2013 | Koponen et al. |
| 2013/0044752 A1 | 2/2013 | Koponen et al. |
| 2013/0054761 A1 | 2/2013 | Kempf et al. |
| 2013/0058346 A1 | 3/2013 | Sridharan et al. |
| 2013/0060940 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0125230 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |

(56) References Cited

U.S. PATENT DOCUMENTS

| | | | |
|---|---|---|---|
| 2013/0227097 | A1 | 8/2013 | Yasuda et al. |
| 2013/0332602 | A1 | 12/2013 | Nakil et al. |
| 2013/0332619 | A1 | 12/2013 | Xie et al. |
| 2014/0016501 | A1 | 1/2014 | Kamath et al. |
| 2014/0019639 | A1 | 1/2014 | Ueno |
| 2014/0040466 | A1 | 2/2014 | Yang |
| 2014/0189212 | A1 | 7/2014 | Slaight et al. |
| 2014/0247753 | A1 | 9/2014 | Koponen et al. |
| 2014/0348161 | A1 | 11/2014 | Koponen et al. |
| 2014/0351432 | A1 | 11/2014 | Koponen et al. |
| 2015/0009804 | A1 | 1/2015 | Koponen et al. |
| 2015/0263946 | A1* | 9/2015 | Tubaltsev .............. H04L 45/586 370/392 |
| 2015/0304213 | A1 | 10/2015 | Ashihara et al. |
| 2015/0341205 | A1 | 11/2015 | Invernizzi et al. |
| 2016/0021028 | A1* | 1/2016 | Koide ..................... H04L 41/12 370/400 |
| 2016/0050117 | A1* | 2/2016 | Voellmy .............. H04L 12/6418 370/392 |
| 2016/0119224 | A1 | 4/2016 | Ramachandran et al. |
| 2016/0294604 | A1 | 10/2016 | Shakimov et al. |
| 2016/0294680 | A1 | 10/2016 | Shakimov et al. |
| 2017/0091004 | A1 | 3/2017 | Shakimov et al. |
| 2017/0318113 | A1 | 11/2017 | Ganichev et al. |

FOREIGN PATENT DOCUMENTS

| | | |
|---|---|---|
| AU | 2013249154 | 4/2014 |
| AU | 2013249152 | 9/2014 |
| AU | 2013249151 | 3/2016 |
| CA | 2849930 A1 | 5/2013 |
| CN | 101136866 | 3/2008 |
| EP | 0737921 A2 | 10/1996 |
| EP | 1443423 | 8/2004 |
| EP | 1653688 | 5/2006 |
| EP | 2748706 | 7/2014 |
| EP | 2748977 A1 | 7/2014 |
| EP | 2748990 | 7/2014 |
| EP | 2748994 | 7/2014 |
| EP | 2838244 A2 | 2/2015 |
| EP | 2748993 | 9/2015 |
| EP | 2955886 | 12/2015 |
| GB | 2485866 | 5/2012 |
| JP | 07-327050 | 12/1995 |
| JP | H07327050 A | 12/1995 |
| JP | H09266493 A | 10/1997 |
| JP | 2003069609 A | 3/2003 |
| JP | 2003124976 A | 4/2003 |
| JP | 2003318949 A | 11/2003 |
| JP | 2006229967 A | 8/2006 |
| JP | 2009159636 A | 7/2009 |
| JP | 2011-081588 | 4/2011 |
| JP | 2011-166384 | 8/2011 |
| JP | 2011-166700 | 8/2011 |
| WO | 2005112390 A1 | 11/2005 |
| WO | 2008095010 A1 | 8/2008 |
| WO | 2009001845 A1 | 12/2008 |
| WO | WO 2009/042919 | 4/2009 |
| WO | 2010103909 A1 | 9/2010 |
| WO | WO 2011/080870 | 7/2011 |
| WO | WO 2011/083780 | 7/2011 |
| WO | 2012093429 A1 | 7/2012 |
| WO | WO 2013/063332 | 5/2013 |
| WO | WO 2013/158917 | 10/2013 |
| WO | WO 2013/158918 | 10/2013 |
| WO | WO 2013/158920 | 10/2013 |
| WO | WO 2013/184846 | 12/2013 |
| WO | 2017189061 A1 | 11/2017 |

OTHER PUBLICATIONS

Portions of prosecution history of EP13721458.1, Mar. 18, 2015 (mailing date), Nicira, Inc.
Portions of prosecution history of EP15179381.7, Nov. 17, 2015 (mailing date), Nicira, Inc.
Portions of prosecution history of AU2013249152, Apr. 18, 2016 (mailing date), Nicira, Inc.
Invitation to Pay Additional Fees of PCT/US2013/037231, Sep. 19, 2013 (mailing date), Nicira, Inc.
International Search Report and Written Opinion of PCT/US2013/037231, dated Apr. 17, 2014, Nicira, Inc.
International Preliminary Report on Patentability of PCT/US2013/037231, dated Oct. 30, 2014, Nicira, Inc.
International Search Report and Written Opinion of PCT/US2013/037232, dated Oct. 1, 2013, Nicira, Inc.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Backup Guide," Nov. 2007, pp. 1-78, VMware, Inc., Palo Alto, California.
Belaramani, Nalini, et al., "PRACTI Replication," Proc. of NSDI, May 2006, 14 pages.
Casado, Martin, et al., "SANE: A Protection Architecture for Enterprise Networks," Proceedings of the 15th USENIX Security Symposium, Jul. 31, 2006, pp. 1-15.
Ciavaglia, Laurent, et al., "An Architectural Reference Model for Autonomic Networking, Cognitive Networking and Self-management," Draft ETSI GS AFI 002 V0.0.17, Mar. 2012, 179 pages, http://www.etsi.org.
Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 4 pages.
Pankaj, Berde, et al., "ONOS Open Network Operating System an Open-Source Distributed SDN OS," Dec. 19, 2013, 34 pages.
Reitblatt, Mark, et al., "Consistent Updates for Software-Defined Networks: Change You Can Believe In!," Hotnets '11, Nov. 14-15, 2011, 6 pages, ACM, Cambridge, MA, USA, available at http://frenetic-lang.org/publications/consistent-updates-hotnets11.pdf.
Schneider, Fred B., "Implementing Fault-Tolerant Services Using the State Machine Approach: A Tutorial," ACM Computing Surveys, Dec. 1990, 21 pages, vol. 22, No. 4, ACM.
Stribling, Jeremy, et al., "Flexible, Wide-Area Storage for Distributed Systems with WheelFS," NSDI '09: 6th USENIX Symposium on Networked Systems Design and Implementation, Apr. 2009, pp. 43-58, USENIX Association.
Terry, Douglas B., "Managing Update Conflicts in Bayou, a Weakly Connected Replicated Storage System," SIGOPS '95, Dec. 1995, pp. 172-183, ACM, Colorado, USA.
Wang, Wei-Ming, et al., "Analysis and Implementation of an Open Programmable Router Based on Forwarding and Control Element Separation," Journal of Computer Science and Technology, Sep. 2008, 11 pages, vol. 23 Issue 5, Springer International Publishing AG.
Kent, William, "A Simple Guide to Five Normal Forms in Relational Database Theory," Communications of the ACM, Feb. 1, 1983, 6 pages, vol. 26, No. 2, Association for Computing Machinery, Inc., USA.
Non-Published commonly owned U.S. Appl. No. 15/143,462, filed Apr. 29, 2016, 44 pages, Nicira Inc.
PCT International Search Report and Written Opinion for commonly owned International Patent Application PCT/US17/13820, dated May 4, 2017, 15 pages, Nicira, Inc.
Non-Published Commonly Owned International Patent Application PCT/US17/13820, filed Jan. 17, 2017, 43 pages, Nicira, Inc.
Non-Published commonly Owned U.S. Appl. No. 15/824,770, filed Nov. 28, 2017, 62 pages, Nicira Inc.
Adya, Atul, et al., "Cooperative Task Management without Manual Stack Management," Jun. 2002, 14 pages, Proceedings of the USENIX Annual Technical Conference, Monterey, CA, USA.

(56) References Cited

OTHER PUBLICATIONS

Caesar, Matthew, et al., "Design and Implementation of a Routing Control Platform," NSDI '05: 2nd Symposium on Networked Systems Design & Implementation, Apr. 2005, 14 pages, USENIX Association.

Cai, Zheng, et al., "The Preliminary Design and Implementation of the Maestro Network Control Platform," Oct. 1, 2008, 17 pages, NSF.

Casado, Martin, et al. "Ethane: Taking Control of the Enterprise," SIGCOMM'07, Aug. 27-31, 2007, 12 pages, ACM, Kyoto, Japan.

Enns, R., "NETCONF Configuration Protocol," Dec. 2006, 96 pages, IETF Trust (RFC 4741).

Greenberg, Albert, et al., "A Clean Slate 4D Approach to Network Control and Management," ACM SIGCOMM Computer Communication Review, Oct. 2005, 12 pages, vol. 35, No. 5.

Greenberg, Albert, et al., "VL2: A Scalable and Flexible Data Center Network," SIGCOMM'09, Aug. 17-21, 2009, 12 pages, ACM, Barcelona, Spain.

Gude, Natasha, et al., "NOX: Towards an Operating System for Networks," ACM SIGCOMM Computer communication Review, Jul. 2008, 6 pages, vol. 38, No. 3.

Hinrichs, Timothy L., et al., "Practical Declarative Network Management," WREN'09, Aug. 21, 2009, 10 pages, Barcelona, Spain.

Loo, Boon Thau, et al., "Declarative Routing: Extensible Routing with Declarative Queries," In Proc. Of SIGCOMM, Aug. 21-26, 2005, 12 pages, Philadelphia, PA, USA.

Loo, Boon Thau, et al., "Implementing Declarative Overlays," In Proc. of SOSP, Oct. 2005,16 pages, Brighton, UK.

McKeown, Nick, et al., "OpenFlow: Enabling Innovation in Campus Networks," ACS SIGCOMM Computer Communication Review, Apr. 2008, 6 pages, vol. 38, No. 2.

Mogul, Jeffrey C., et al., "API Design Challenges for Open Router Platforms on Proprietary Hardware," Oct. 2008, 6 pages.

Mysore, Radhika Niranjan, et al., "PortLand: A Scalable Fault-Tolerant Layer 2 Data Center Network Fabric," Proc. of SIGCOMM, Aug. 17-21, 2009, 12 pages.

Shenker, Scott, et al., "The Future of Networking, and the Past of Protocols," Dec. 2, 2011, 30 pages, USA.

Tavakoli, Arsalan, et al., "Applying NOX to the Datacenter," Proc. HotNets, Month Unknown, 2009, 6 pages.

\* cited by examiner

USING TRANSACTIONS TO COMPUTE AND PROPAGATE NETWORK FORWARDING STATE

CLAIM OF BENEFIT TO PRIOR APPLICATIONS

This application is a continuation application of U.S. patent application Ser. No. 14/348,885, filed Mar. 31, 2014, now published as U.S. Publication 2014/0247753. U.S. patent application Ser. No. 14/348,885 is a national stage application of PCT Application PCT/US2013/037231, filed Apr. 18, 2013, now published as WO 2013/158917. PCT Application PCT/US2013/037231 claims benefit of U.S. Provisional Patent Application 61/635,056, filed Apr. 18, 2012; U.S. Provisional Patent Application 61/635,226, filed Apr. 18, 2012; U.S. Provisional Patent Application 61/647,516, filed May 16, 2012; and U.S. Provisional Patent Application 61/684,693, filed Aug. 17, 2012. PCT Application PCT/US2013/037231, published as WO 2013/158917, and U.S. Provisional Patent Applications 61/635,056, 61/635,226, 61/647,516, and 61/684,693 are incorporated herein by reference.

BACKGROUND

Within networks, it is the network forwarding state that carries packets from the packets' network entry points to their egress points. Hop-by-hop, the forwarding state makes the network elements forward a packet to an element that is a step closer to the destination of the packet. Clearly, computing forwarding state that is in compliance with the configured network policies is crucial for the operation of the network. That is because without the proper forwarding state, the network will not deliver packets to their destinations, nor will the forwarding be done according to the configured policies.

BRIEF SUMMARY

Some embodiments of the invention provide a controller cluster that updates forwarding state to specify a new network policy. The controller cluster sends the updated forwarding state to a set of forwarding elements in a manner that the forwarding elements consistently apply the new network policy to a packet and do not apply a mixture of the new and old policies.

In some embodiments, the controller cluster configures a first-hop managed forwarding element, which is in the beginning of a path for a packet, to make all the logical forwarding decisions (e.g., finding logical egress ports and identifying physical egress ports to the logical egress ports) to forward the packet. Other managed and unmanaged forwarding elements in the path of the packet do not make logical forwarding decisions for the packet and thus does not need nor receive the forwarding state. These other forwarding elements are used merely as fabric for sending the packet to the destination based on the packet's source and destination information. The packet does not need to carry any version information to indicate that the packet should be forwarded using the updated forwarding state. This is because all the logical forwarding decisions for the packet is performed by the first-hop managed forwarding element and the non-first-hop forwarding elements do not receive the updated forwarding state. The packet is forwarded only by the new policy as the packet is forwarded by the first-hop managed forwarding element that makes all the logical forwarding decisions based on the new policy.

In some embodiments, the controller cluster configures the managed forwarding elements in a way that the logical forwarding decisions are spread over and performed by the first-hop as well as non-first-hop forwarding elements. In these embodiments, the controller cluster first sends the updated forwarding state to the non-first-hop forwarding elements that are in the path of the packet. Only after the controller cluster sends the updated forwarding state to the non-first-hop forwarding elements, the controller cluster sends the updated forwarding state to the first-hop forwarding element of the packet. The controller cluster then directs the first-hop forwarding element to use the updated forwarding state to forward the packet. In some embodiments, the packet forwarded by the first-hop forwarding element carries version information that indicates that the packet should be forwarded using the updated forwarding state. In this manner, the packet forwarded by the first-hop forwarding element to the non-first-hop forwarding elements is guaranteed to be forwarded under the new network policy.

Some embodiments of the invention also provide a managed forwarding element that is configured to achieve a transaction across a set of channels that the managed forwarding element has established with several network controllers of a network controller cluster. In particular, the managed forwarding element of some embodiments does not commit the forwarding state received through the channels until a barrier is received through a particular channel. Barriers that the managed forwarding element may have received through the other channels does not make the managed forwarding element to commit the forwarding state received. That is, only after a barrier is received from the particular channel, the managed forwarding element commits the forwarding state. In this manner, the managed forwarding batches transactional inputs coming through the other channels with the transactional inputs coming through the particular channel.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
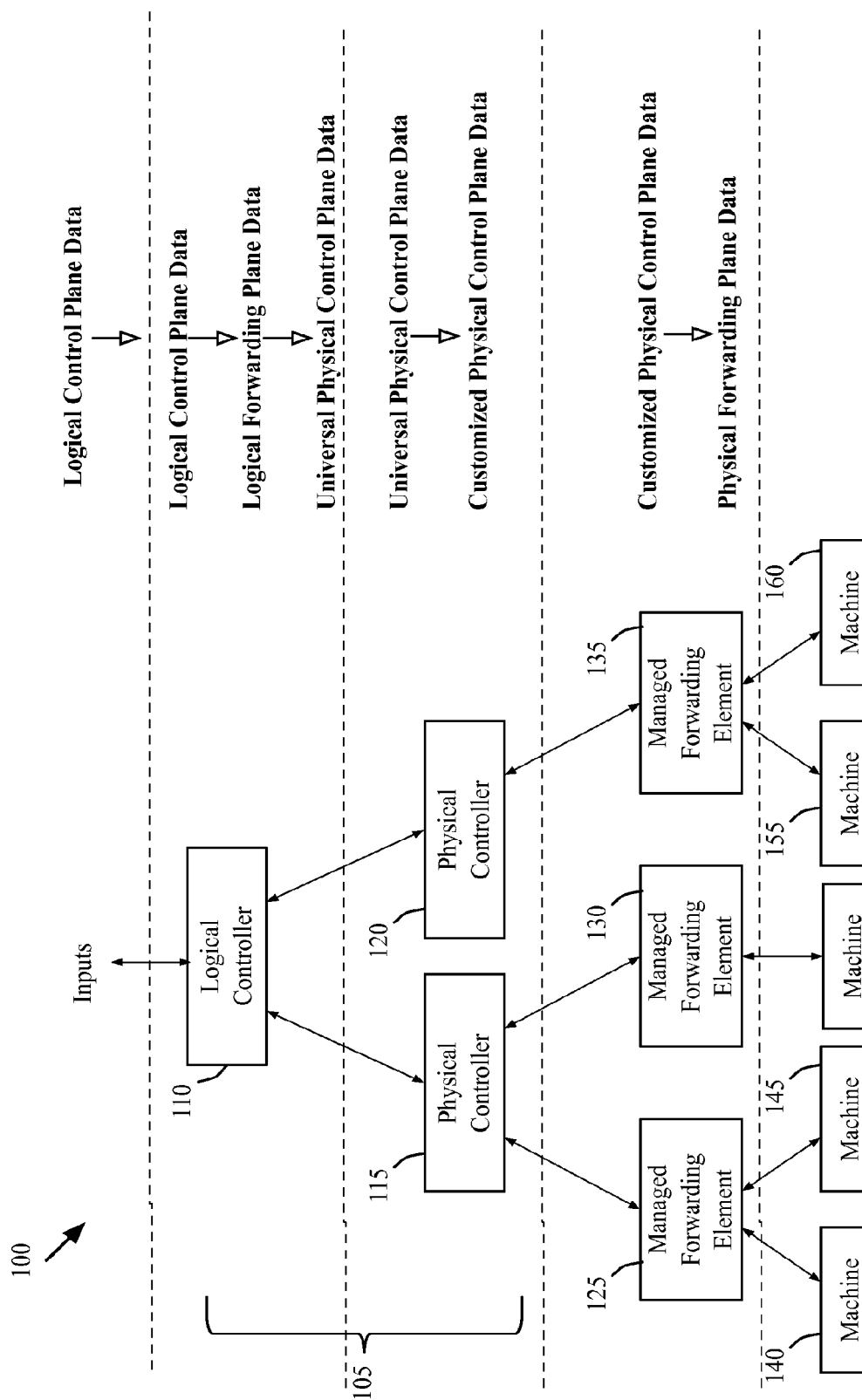
FIG. 1 describes an example hierarchy of network controllers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system in which network controllers compute forwarding state information to push to a set of managed forwarding elements in order to define forwarding behaviors of the set of managed forwarding elements. The controllers also update the forwarding state information to modify the forwarding behaviors of the managed forwarding elements. When the network controllers update the forwarding state information, the controllers push down the updated forwarding state information to the managed forwarding elements so that the managed forwarding elements forward data (e.g., in the form of data packets) in the network according to the updated forwarding state information.

In some embodiments, the controllers push the updated forwarding state information to the managed forwarding elements in a manner that all of the managed forwarding elements that are in the path of a packet apply the updated forwarding state information. For instance, in some embodiments, the controllers configure a first-hop forwarding element in the path of the packet to perform all logical forwarding decisions such that the other forwarding elements in the path merely serve as forwarding fabric to forward the packet to the destination. In these embodiments, the controllers send the updated forwarding state information to the first-hop forwarding element only. This eliminates the need of any version information in the packet to indicate the non-first-hop forwarding elements should use the updated forwarding information to forward the packet towards the destination.

In some embodiments, the controllers configure the forwarding elements such that the logical forwarding decisions are made by the first-hop as well as the no-first-hop forwarding elements of the path of the packet. In some of these embodiments, the controllers first send the updated forwarding state information to all of the managed forwarding elements in the path of the packet (i.e., the path between the entry point and the exit point of the packet) except one managed forwarding element that is a first-hop forwarding element with respect to the packet. The first-hop forwarding element for the packet receives the packet directly from the source machine. That is, the first-hop forwarding element for the packet is at the beginning of the path.

The controllers then send the updated forwarding state information to the first-hop managed forwarding element. In some embodiments, the first-hop managed forwarding element includes version information in the packet as the first-hop managed forwarding element forwards the packet to a next-hop forwarding element. This version information indicates that the packet should be forwarded based on the updated forwarding state information rather than the old forwarding state information. In this manner, the packet received and forwarded by the first-hop managed forwarding element that uses the updated forwarding state information is further forwarded by the non-first-hop managed forwarding elements in the path of the packet that have been prepared to use the updated forwarding state information.

More detailed embodiments are described in the following sections. Specifically, Section I first describes a network control system of some embodiments for controlling logical and physical networks. Next, Section II describes network controllers that generate, update, and push forwarding state information according to some embodiments of the invention. Section III follows with a description of a managed forwarding element that uses several communication channels to receive forwarding state information from the controllers. Finally, Section IV describes an electronic system with which some embodiments of the invention are implemented.

I. Network Control System

FIG. 1 illustrates a network control system 100 in which network controllers compute forwarding state information to push to a set of managed forwarding elements in order to define forwarding behaviors of the set of managed forwarding elements. The network control system 100 includes a controller cluster 105 and three managed forwarding elements 125-135. The network controller cluster 105 includes three network controllers—a logical controller 110 and two physical controllers 115 and 120. The network control system 100 represents a simplified example, with one controller cluster 105 pushing state down to three managed forwarding elements. In many cases, the network control system of some embodiments would include numerous controller clusters, each of which includes numerous controllers, and hundreds or thousands of managed forwarding elements.

In some embodiments, the network controller cluster 105 performs computation of forwarding state and pushes this state down to the managed forwarding elements in the form of flow entries. The network controller cluster of some embodiments receives logical control plane (LCP) data that defines a logical network and converts this LCP data into physical control plane (PCP) data to send to the managed forwarding elements 125-135. The logical control plane of a logical network, in some embodiments, defines one or more logical forwarding elements (e.g., logical switches, logical routers) that connect end machines (e.g., virtual machines) in a logical topology. The logical forwarding elements define how packets from a source machine should be forwarded in the logical space to a destination machine (e.g., the binding of virtual machine MAC addresses to logical ports). In addition, in some embodiments the LCP defines logical policies (e.g., access control lists) implemented by the logical forwarding elements. The LCP and its constructs are agnostic to the physical network through which it is implemented.

The network controller cluster of some embodiments performs several distinct conversions of the LCP data to arrive at the PCP data that is pushed down to the managed forwarding elements. In some embodiments, the controller cluster converts the LCP data into logical forwarding plane (LFP) data, and then subsequently converts the LFP data into PCP data. The LFP data defines forwarding entries for forwarding packets in the logical space. That is, beyond simply binding an address to a logical port, the LFP data includes an entry stating that if the address is matched, to forward the packet to the logical port.

The conversion of the LFP data to PCP data integrates the logical forwarding entries into the physical network. The PCP entries contain information to perform forwarding in the logical address space within the physical network (e.g., mapping logical ports to physical ports, etc.).

In some embodiments, the computation of PCP to push to the managed forwarding elements is distributed between different layers of controllers in a controller cluster. For instance, in some embodiments, the logical controller 110 manages at least one logical forwarding element. The logical controller 110 performs the LCP to LFP conversion and a subsequent LFP to universal PCP (UPCP) conversion as indicated by the right half of this figure. UPCP data includes flow entries that have not been customized to include data specific to any managed forwarding element, and instead only include abstractions for such data that is specific to a particular physical implementation (e.g., port numbers, tunnel identifiers, etc.).

The logical controller that manages a particular logical forwarding element sends the UPCP data to any number of physical controllers in some embodiments. For instance, the logical controller 110 sends the UPCP data to the two physical controllers 115 and 120. Each managed forwarding element is managed by a master physical controller. Thus, UPCP data for a logical forwarding element implemented across several managed forwarding elements may be sent to the several different master physical controllers that managed these forwarding elements. As shown, the physical controller 115 is the master controller that manages two managed forwarding elements 125 and 130. The physical controller 120 is the master controller that manages the managed forwarding element 135.

At either the physical controller, or a chassis controller (not shown in this figure) in the same physical machine as the managed forwarding element, the UPCP data is converted to customized PCP (CPCP) data. The CPCP data is the physical control plane data with the customization data particular to a specific managed forwarding element filled in. As mentioned, in some embodiments the physical controller performs this conversion using information received from the managed forwarding element. In other embodiments, the physical controller acts as a pass-through to send the UPCP data to the host machine on which the managed forwarding element resides, where controller logic (the chassis controller) performs the UPCP to CPCP conversion.

The managed forwarding elements 125-135 are software or hardware forwarding elements that are managed by (e.g., receive forwarding state information from) the network controller. In some embodiments, the managed forwarding elements are software forwarding elements that operate on a host machine (e.g., within the user space and/or kernel of the host machine). These managed forwarding elements receive packets from end machines 140-160, perform logical processing on the packets, and send the packets across the physical network to their destination (e.g., at another end machine also connected to a different managed forwarding element).

The end machines 140-160 may be physical machines or virtual machines. In some embodiments, the end machines as virtual machines operate in the same hosts with the managed forwarding elements that forward packets for the end machines. Because virtual machines belonging to multiple physical networks may be located within a single host machine (e.g., the end machines 140 and 145 may be located within the same host machine in which the managed forwarding element 125 is located), each managed forwarding element may implement multiple different logical forwarding elements. Additionally, as indicated above, a single logical forwarding element will generally be implemented across numerous managed forwarding elements.

In addition to the managed forwarding elements located at the network edge, on hosts with the virtual machines, some embodiments additionally include second-level non-edge managed forwarding elements (referred to in some cases as pool nodes or service nodes). When an edge managed forwarding element is unable to perform all of the processing for a packet (e.g., because it does not have a flow entry for binding a destination MAC address to a logical port), the edge managed forwarding element sends the packet to a pool node in order for the pool node to process the packet and send the packet towards its destination.

Figure 2:
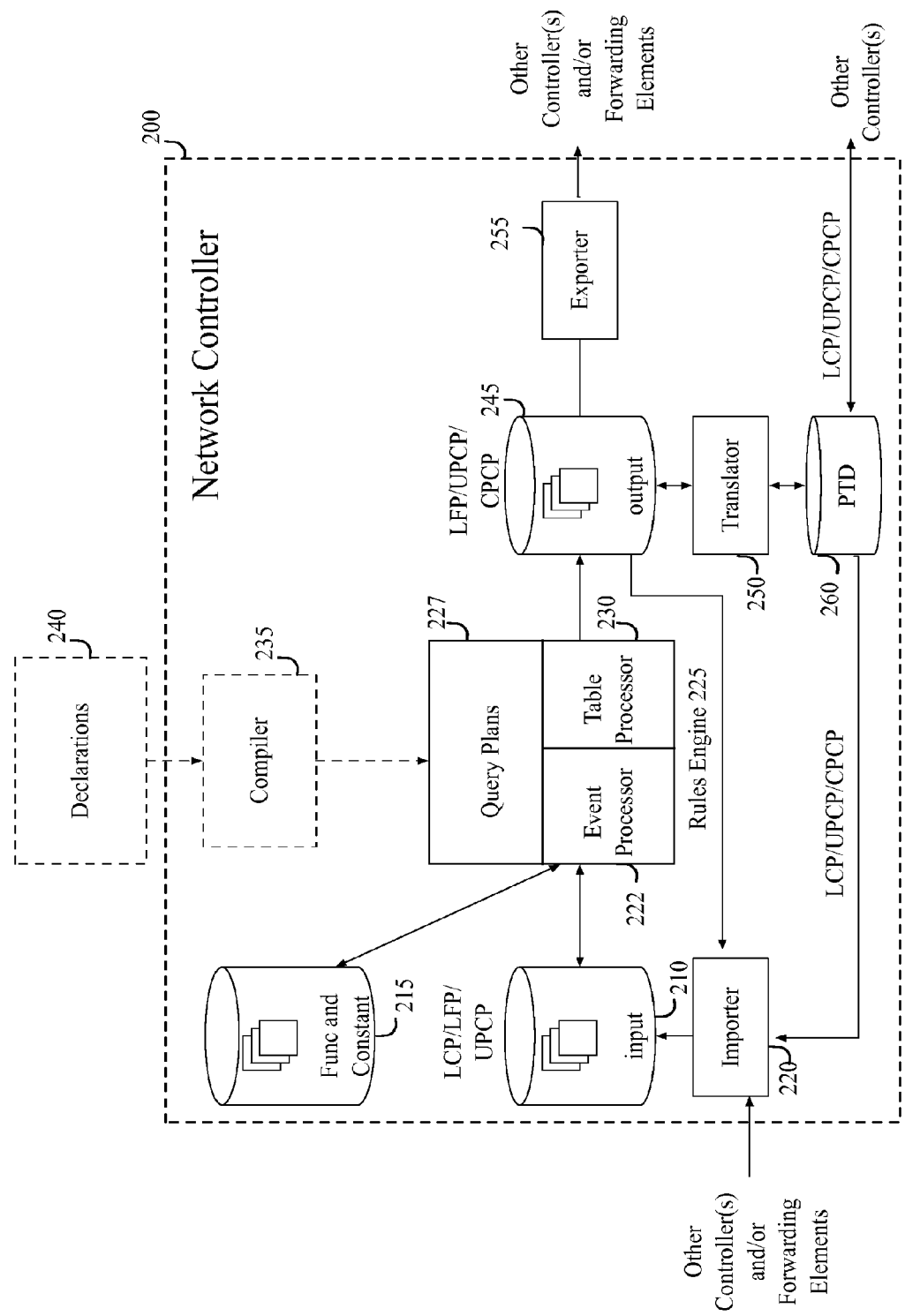
FIG. 2 illustrates architecture of a network controller of some embodiments.

FIG. 2 conceptually illustrates example architecture of a network controller 200 of some embodiments. The network controller 200 is capable of functioning as a logical controller, a physical controller, or a chassis controller, depending on the types of data that the network controller 200 handles.

As a logical controller, the network controller 200 takes as inputs the LCP data. The network controller 200 translates the LCP data into LFP data and then into the UPCP data in some embodiments. The network controller 200 pushes the UPCP data to a set of physical controllers that are masters of the managed forwarding elements that implement the logical forwarding elements that the network controller 200 as a logical controller manages.

As a physical controller of some embodiments, the network controller 200 takes as inputs the UPCP data and translates the UPCP data into the CPCP data. The network controller then pushes the CPCP data to a set of managed forwarding elements of which the network controller 200 is a master. In other embodiments, the network controller 200 as a physical controller relays the UPCP data to a set of chassis controllers that operate in the hosts in which a set of managed forwarding elements operate. The network controller 200 is the master of this set of managed forwarding elements in these embodiments.

As a chassis controller, the network controller 200 takes as inputs the UPCP data from a set of physical controllers.

The network controller 200 translates the UPCP data to the CPCP data for a managed forwarding element that the chassis controller manages and then sends the CPCP data to the managed forwarding element.

As shown in FIG. 2, the network controller 200 includes a set of rule-engine input tables 210, a set of function and constant tables 215, an importer 220, a rules engine 225, a set of rule-engine output tables 245, a translator 250, an exporter 255, a persistent transactional database (PTD) 260, and a compiler 235. The compiler 235 is one component of the controller that operates at a different instance in time than the controller's other components. The compiler operates when a developer needs to specify the rules engine for a particular network controller and/or virtualized environment, whereas the rest of the controller's modules operate at runtime when the controller interfaces with other controllers or managed forwarding elements.

In some embodiments, the compiler 235 takes a relatively small set (e.g., few hundred lines) of declarative instructions 240 that are specified in a declarative language and converts these into a large set (e.g., thousands of lines) of code (i.e., object code) that specifies the operation of the rules engine 225, which performs the controller's table mapping. As such, the compiler greatly simplifies the network controller developer's process of defining and updating the network controller. This is because the compiler allows the developer to use a high level programming language that allows a compact definition of the network controller's complex mapping operation and to subsequently update this mapping operation in response to any number of changes (e.g., changes in the logical networking functions supported by the network controller, changes to desired behavior of the network controller, etc.). Moreover, the compiler relieves the developer from considering the order at which the events would arrive at the network controller, when the developer is defining the mapping operation. Also, the developer programs the network controller 200 with different rules sets to make the network controller 200 function as a logical controller, a physical controller, or a chassis controller.

In some embodiments, the rule-engine (RE) input tables 210 include tables with different types of data based on the type of network controller as which the network controller 200 operates. The input tables 210 include LCP data that need to be mapped to LFP data, and include LFP data that need to be mapped to UPCP data when the network controller 200 operates as a logical controller. The input tables 210 include UPCP data that need to be mapped to CPCP data when the network controller 200 operates as a physical controller or as a chassis controller.

In addition to the RE input tables 210, the network controller 200 includes other miscellaneous tables 215 that the rules engine 225 uses to gather inputs for its table mapping operations. These tables 215 include constant tables that store defined values for constants that the rules engine 225 needs to perform its table mapping operations. For instance, the constant tables 215 may include a constant "zero" that is defined as the value 0, a constant "dispatch_port_no" as the value 4000, and a constant "broadcast_MAC_addr" as the value 0xFF:FF:FF:FF:FF:FF.

When the rules engine 225 references constants, the corresponding value defined for the constants are actually retrieved and used. In addition, the values defined for constants in the constant tables 215 may be modified and/or updated. In this manner, the constant tables 215 provide the ability to modify the value defined for constants that the rules engine 225 references without the need to rewrite or recompile code that specifies the operation of the rules engine 225. The tables 215 further include function tables that store functions that the rules engine 225 needs to use to calculate values needed to populate the output tables 245.

The rules engine 225 performs table mapping operations that specifies one manner for converting the input data to the output data. Whenever one of the rule-engine (RE) input tables is modified, the rules engine performs a set of table mapping operations that may result in the modification of one or more data tuples in one or more RE output tables. In some embodiments, the network control system uses a variation of the datalog database language, called nLog, to create the rules engine 225. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

As shown in FIG. 2, the rules engine 225 includes an event processor 222, several query plans 227, and a table processor 230. Each query plan is a set of rules that specifies a set of join operations that are to be performed upon the occurrence of a modification to one of the RE input tables. Such a modification is referred to below as an input table event. Each query plan is generated by the compiler 235 from one declaratory rule in the set of declarations 240. In some embodiments, more than one query plan is generated from one declaratory rule. For instance, a query plan is created for each of the tables joined by one declaratory rule. That is, when a declaratory rule specifies to join four tables, four different query plans will be created from that one declaration. In some embodiments, the query plans are defined by using the nLog declaratory language.

The event processor 222 of the rules engine 225 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 222 detects an input table event when it receives notification from an RE input table that one of its records has changed.

In response to a detected input table event, the event processor 222 (1) selects the appropriate query plan for the detected table event, and (2) directs the table processor 230 to execute the query plan. To execute the query plan, the table processor 230, in some embodiments, performs the join operations specified by the query plan to produce one or more records that represent one or more sets of data values from one or more input and miscellaneous tables 210 and 215. The table processor 230 of some embodiments then (1) performs a select operation to select a subset of the data values from the record(s) produced by the join operations, and (2) writes the selected subset of data values in one or more RE output tables 245.

In some embodiments, the RE output tables 245 store both logical and physical network element data attributes. The tables 245 are called RE output tables as they store the output of the table mapping operations of the rules engine 225. In some embodiments, the RE output tables can be grouped in several different categories. For instance, in some embodiments, these tables can be RE input tables and/or controller output tables. A table is an RE input table when a change in the table causes the rules engine to detect an input event that requires the execution of a query plan. A RE output table 245 can also be an RE input table 210 that generates an event that causes the rules engine to perform another query plan. Such an event is referred to as an internal input event, and it is to be contrasted with an external input event, which is an event that is caused by an RE input table modification made by the importer 220.

A table is a controller output table when a change in the table causes the exporter 255 to export a change to another controller(s) or managed forwarding element(s). A table in the RE output tables 245 can be an RE input table, a controller output table, or both an RE input table and a controller output table. In some embodiments, the RE input tables and the RE output tables are tables of a relational database management system (RDBMS). These tables are stored as relational database data structures, which are the primary data storage structure of the network controller.

The exporter 255 detects changes to the controller output tables of the RE output tables 245. The exporter of different embodiments detects the occurrence of a controller output table event differently. In some embodiments, the exporter registers for callbacks with the controller output tables for notification of changes to the records of the controller output tables. In such embodiments, the exporter 255 detects an output table event when it receives notification from a controller output table that one of its records has changed.

In response to a detected output table event, the exporter 255 takes some or all of modified data tuples in the modified controller output tables and propagates this modified data tuple(s) to other controllers or managed forwarding elements. Specifically, when the network controller 200 operates as a logical controller, the exporter 255 propagates the UPCP data to a set of physical controllers through a set of communication channels (e.g., remote procedure call (RPC) channels) established with the physical controllers. When the network controller 200 operates as a physical controller, the exporter 255 of some embodiments propagates the UPCP data to a set of chassis controllers through a set of communication channels established with the chassis controllers. The exporter 255 of other embodiments propagates the CPCP data to a set of managed forwarding elements through a pair of communication channels (e.g., an OpenFlow channel and a configuration channel) established with each of the managed forwarding elements. When the network controller 200 operates as a chassis controller, the exporter 255 of some embodiments propagates the CPCP data to a set of managed forwarding elements through a pair of communication channels (e.g., an OpenFlow channel and a configuration channel) with each of the managed forwarding elements.

In some embodiments, the network controller does not keep in the output tables 245 the data that the network controller is not responsible for managing. However, such data will be translated by the translator 250 into a format that can be stored in the PTD and gets stored in the PTD 260. The PTD is a secondary storage structure for the network controller. The PTD of the network controller 200 propagates this data to one or more other network controllers so that some of the other network controllers that are responsible for managing the data can process the data.

In some embodiments, the network controller also brings the data stored in the output tables 245 (i.e., the data that the network controller is responsible for managing) to the PTD for resiliency of the data. Such data is also translated by the translator 250, stored in the PTD, and propagated to other PTDs of other controller instances. Therefore, in these embodiments, a PTD of a controller instance has all the configuration data for all data managed by the network control system. That is, each PTD contains the global view of the configuration of the logical and physical network in some embodiments.

The importer 220 interfaces with a number of different sources of input data and uses the input data to modify or create the input tables 210. The importer 220 of some embodiments receives the input data from a user (a tenant) through an input translation controller (not shown) that translates the user inputs into LCP data when the network controller 200 operates as a logical controller. The importer 220 receives the LCP data through communication channels in some embodiments. The importer 220 also interfaces with the PTD 260 so that the data received through the PTD from other controller instances can be used as input data to modify or create the input tables 210. Moreover, the importer 220 also detects changes in the RE input tables and controller output tables of the RE output tables 245. The LFP data produced and stored in the output tables 245 are fed back to the rules engine 225 by the importer 220 for the rules engine 225 to produce the UPCP data.

When the network controller 200 operates as a physical controller, the importer 220 gets the UPCP data from a set of logical controllers through a set of communication channels established with the set of logical controllers. When the network controller 200 operates as a chassis controller, the importer gets the UPCP data from a set of physical controllers through a set of communication channels established with the set of physical controllers.

Figure 3:
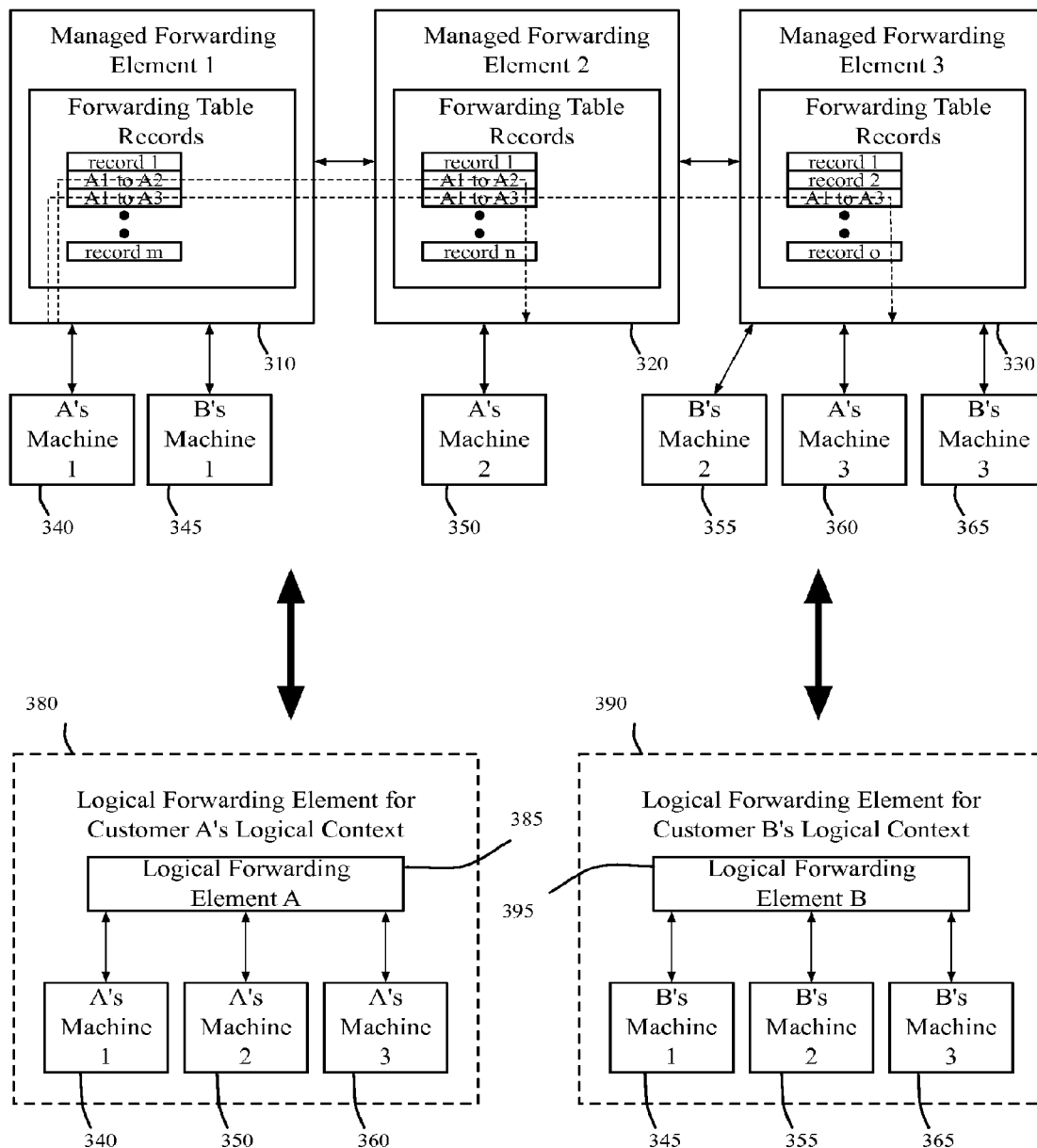
FIG. 3 illustrates an example of multiple logical switching elements implemented across a set of managed forwarding elements.

FIG. 3 conceptually illustrates logical forwarding elements 380 and 390 implemented across managed forwarding elements 310-330. The top half of this figure shows three managed forwarding elements 310-330 and end machines 340-365. As indicated in this figure, the machines 340, 350, and 360 belong to user A and the machines 345, 355, and 365 belong to user B. This figure shows that a logical forwarding element is connected to several end machines and is implemented in several managed forwarding elements for simplicity of illustration and description. As mentioned above, a logical forwarding element may be connected to numerous end machines and implemented in numerous managed forwarding elements.

The managed forwarding elements 310-330 of some embodiments forward network data (e.g., packets, frames, etc.) between network elements in the network that are coupled to the managed forwarding elements 310-330. As shown, the managed forwarding element 310 forwards network data between the machines 340 and 345 and the forwarding element 320. Similarly, the forwarding element 320 forwards network data between the machine 350 and the managed forwarding elements 310 and 330, and the forwarding element 330 forwards network data between the machines 355-365 and the forwarding element 320.

Moreover, each of the managed forwarding elements 310-330 forwards network data based on the forwarding element's forwarding logic, which in some embodiments are in the form of tables. In some embodiments, a forwarding table determines where to forward network data (e.g., a port on the forwarding element) according to forwarding criteria. For instance, a forwarding table of a layer 2 forwarding element may determine where to forward network data based on MAC addresses (e.g., source MAC address and/or destination MAC address). As another example, a forwarding table of a layer 3 forwarding element may determine where to forward network data based on IP addresses (e.g., source IP address and/or destination IP address). Many other types of forwarding criteria are possible.

As shown, the forwarding table in each of the managed forwarding elements 310-330 includes several records. In some embodiments, each of the records specifies operations for forwarding network data based on forwarding criteria. The records may be referred to as flow entries in some embodiments as the records control the "flow" of data through the managed forwarding elements 310-330.

The bottom half of FIG. 3 illustrates conceptual representations of each user's logical network. As shown, the logical network 380 of user A includes a logical forwarding element 385 to which user A's machines 340, 350, and 360 are coupled. User B's logical network 390 includes a logical forwarding element 395 to which user B's machines 345, 355, and 365 are coupled. As such, from the perspective of user A, user A has a forwarding element to which only user A's machines are coupled, and, from the perspective of user B, user B has a forwarding element to which only user B's machines are coupled. In other words, to each user, the user has its own network that includes only the user's machines.

The following will describe the conceptual flow entries for implementing the flow of network data originating from the machine 340 and destined for the machine 350 and originating from the machine 340 and destined for the machine 360. First, the flow entries for forwarding network data originating from the machine 340 and destined for the machine 350 will be described followed by the flow entries for forwarding network data originating from the machine 340 and destined for the machine 360.

The flow entry "A1 to A2" in the managed forwarding element 310's forwarding table instructs the managed forwarding element 310 to forward network data that originates from machine 310 and is destined for the machine 350 to the forwarding element 320. The flow entry "A1 to A2" in the forwarding table of the forwarding element 320 instructs the forwarding element 320 to forward network data that originates from machine 310 and is destined for the machine 350 to the machine 350.

Furthermore, the flow entry "A1 to A3" in the managed forwarding element 310's forwarding table instructs the managed forwarding element 310 to forward network data that originates from machine 340 and is destined for the machine 360 to the forwarding element 320. The flow entry "A1 to A3" in the forwarding table of the forwarding element 320 instructs the forwarding element 320 to forward network data that originates from machine 340 and is destined for the machine 360 to the forwarding element 330. The flow entry "A1 to A3" in the forwarding table of the forwarding element 330 instructs the forwarding element 330 to forward network data that originates from machine 340 and is destined for the machine 360 to the machine 360.

While conceptual flow entries for forwarding network data originating from the machine 340 and destined for the machine 350 and originating from the machine 340 and destined for the machine 360 are described above, similar flow entries would be included in the forwarding tables of the managed forwarding elements 310-330 for forwarding network data between other machines in user A's logical network 380. Moreover, similar flow entries would be included in the forwarding tables of the managed forwarding elements 310-330 for forwarding network data between the machines in user B's logical network 390.

The conceptual flow entries shown in FIG. 3 include both the source and destination information for the managed forwarding elements to figure out the next-hop forwarding elements to which to send the packets. However, the source information does not have to be in the flow entries as the managed forwarding elements of some embodiments can figures out the next-hop forwarding elements using the destination information (e.g., a destination address, etc.) only.

In some embodiments, tunnels provided by tunneling protocols (e.g., control and provisioning of wireless access points (CAPWAP), generic forward encapsulation (GRE), GRE Internet Protocol Security (IPsec), etc.) may be used to facilitate the implementation of the logical forwarding elements 385 and 395 across the managed forwarding elements 310-330. By tunneling, a packet is transmitted through the forwarding elements as a payload of another packet. That is, a tunneled packet does not have to expose its addresses (e.g., source and destination MAC addresses) as the packet is forwarded based on the addresses included in the header of the outer packet that is encapsulating the tunneled packet. Tunneling, therefore, allows separation of logical address space from the physical address space as a tunneled packet can have addresses meaningful in the logical address space while the outer packet is forwarded based on the addresses in the physical address space. In this manner, the tunnels may be viewed as the "logical wires" that connect managed forwarding elements in the network in order to implement the logical forwarding elements 385 and 395.

Configuring the forwarding elements in the various ways described above to implement multiple logical forwarding elements across a set of forwarding elements allows multiple users, from the perspective of each user, to each have a separate network and/or forwarding element while the users are in fact sharing some or all of the same set of forwarding elements and/or connections between the set of forwarding elements (e.g., tunnels, physical wires).

Figure 4:
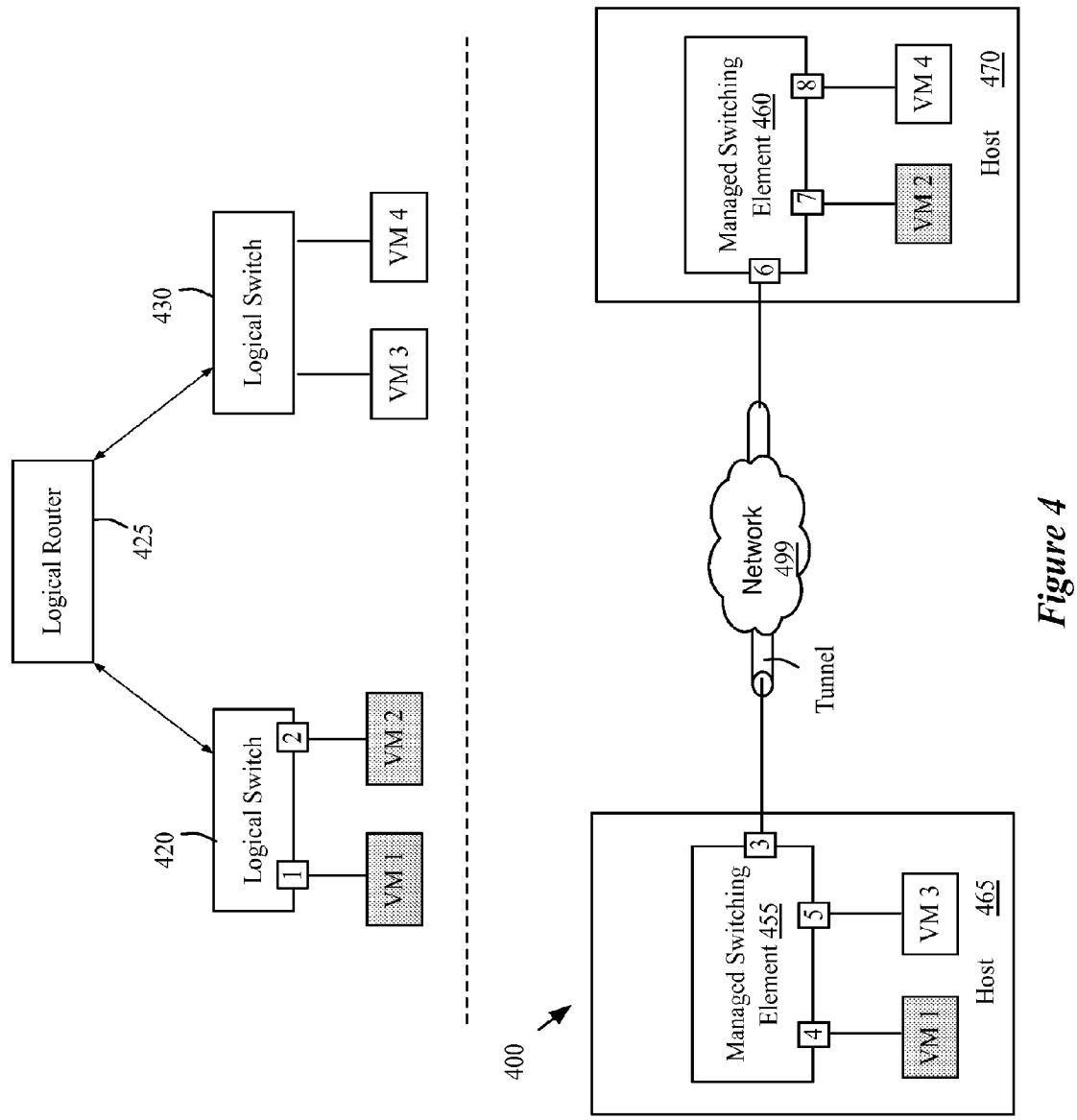
FIG. 4 illustrates several logical forwarding elements implemented in a physical infrastructure.

Although FIG. 3 illustrates implementation of logical forwarding elements in a set of managed forwarding elements, it is possible to implement a more complex logical network (e.g., that includes several logical L3 forwarding elements) by configuring the forwarding tables of the managed forwarding elements. FIG. 4 conceptually illustrates an example of a more complex logical network. FIG. 4 illustrates network architecture 400 of some embodiments which implements three logical forwarding elements—a logical router 425 and logical switches 420 and 430. Specifically, the network architecture 400 represents a physical network that effectuate logical networks whose data packets are forwarded by the logical router 425 and the logical switches 420 and 430. The figure illustrates in the top half of the figure the logical router 425 and the logical switches 420 and 430. This figure illustrates, in the bottom half of the figure, the managed forwarding elements 455 and 460. The figure illustrates end machines (e.g., virtual machines (VMs)) 1-4 in both the top and the bottom of the figure.

In this example, the logical switching element 420 forwards data packets between the logical router 425, the end machine 1, and the end machine 2. The logical switching element 430 forwards data packets between the logical router 425, the end machine 3, and the end machine 4. As mentioned above, the logical router 425 routes data packets between the logical switches 420 and 430 and other logical routers and switches (not shown). The logical switches 420 and 430 and the logical router 425 are logically coupled through logical ports (not shown) and exchange data packets through the logical ports. These logical ports are mapped or attached to physical ports of the managed forwarding elements 455 and 460.

In some embodiments, a logical router is implemented in each managed switching element in the managed network. When the managed switching element receives a packet from a machine that is coupled to the managed switching element, the managed switching element performs the logical routing. In other words, a managed switching element that is a first-hop switching element with respect to a packet performs the logical routing in these embodiments.

In this example, the managed forwarding elements 455 and 460 are software switches running in hosts 465 and 470, respectively. The managed forwarding elements 455 and 460 have flow entries which implement the logical switches 420 and 430 to forward and route the packets that the managed switching element 455 and 460 receive from the end machines 1-4. The flow entries also implement the logical router 425. Using these flow entries, the managed forwarding elements 455 and 460 can forward and route packets between network elements in the network that are coupled to the managed forwarding elements 455 and 460.

As shown, the managed forwarding elements 455 and 460 each have three ports (e.g., virtual interfaces (VIFs)) through which to exchange data packets with the network elements that are coupled to the managed forwarding elements 455 and 460. In some cases, the data packets in these embodiments will travel through a tunnel that is established between the managed forwarding elements 455 and 460 (e.g., the tunnel that terminates at port 3 of the managed switching element 455 and port 6 of the managed switching element 460). This tunnel makes it possible to separate addresses in logical space and the addresses in physical space.

In this example, each of the hosts 465 and 470 includes a managed switching element and several end machines as shown. The end machines 1-4 are each assigned a set of network addresses (e.g., a MAC address for L2, an IP address for network L3, etc.) and can send and receive network data to and from other network elements. The end machines are managed by hypervisors (not shown) running on the hosts 465 and 470. The end machines 1 and 2 are associated with logical ports 1 and 2, respectively, of the same logical switch 420. However, the machine 1 is associated with the port 4 of the managed switching element 455 and the machine 2 is associated with the port 7 of the managed switching element 460. The logical ports 1 and 2 are therefore mapped to the ports 4 and 7, respectively, but this mapping does not have to be exposed to any of the network elements (not shown) in the network. This is because the packets that include this mapping information will be exchanged between the end machines 1 and 2 over the tunnel based on the outer header of the outer packets that carry the packets with mapping information as payloads.

Having described a network control system and implementation of a logical network in a physical infrastructure, Section II below describes transactional propagation of the updated forwarding state to the managed forwarding elements.

II. Using Transactionality

There are several challenges to updating the forwarding state (i.e., migrating from a previously computed state to a newly computed state) after the network configuration has changed. Several solutions are described below. These solutions consider the problem in two dimensions—correctness and efficiency. That is, these solutions consider how the state that is currently present in the network can guarantee that the network policies are obeyed correctly, not only before and after the update but also during the update. In terms of efficiency, these solutions consider how the cost of potentially large state updates can be minimized.

In the discussion below, the network control system includes a centralized cluster of controllers that compute the forwarding state for the forwarding elements, in order to manage the network forwarding elements. Also, in the discussion below, "network policy" includes any configurational aspects: not only security policies, but also policies regarding how to route the network traffic, as well as any physical (or logical) network configuration. Hence, in this discussion, a "policy" is used for anything that relates to user-configured input.

A. Requirement for Transactions

A packet is what the forwarding state operates over. It is imperative that a single packet is forwarded according to a single consistent policy and not a mixture of states representing old and new policies. Subsequent packets may be treated by different versions of the policy, as long as the transition from an old version to a new version occurs in a manner that prevents a packet from being treated by a mixture of old and new policies.

The requirement for an atomic transition to a new policy implies that the updates to the forwarding state have to be transactional. However, as discussed above, it does not imply the whole network forwarding state should be atomically updated at the same time. In particular, the network control system of some embodiments relaxes this requirement in two regards. First, for a stream of packets from a source towards one or more destinations, it is not critical to specify at which point the policy changes from an old one to new one. It is only essential that no packet gets forwarded according to a mixture of the old and new policies. Each packet should either be forwarded according to the old policy or the new policy. Second, the network control system of some embodiments allows different policies to be transiently applied to different streams of packets that ingress into the network at different locations. Again, these embodiments only require that a single packet experience only a single policy and not a mixture of the old and new policies.

B. Implementing Transactional Updates

Given these requirements and relaxations, the implementation of these transactional updates will now be considered. In M. Reitblatt, et al, "Consistent Updates for Software-Defined Networks: Change You Can Believe in!," Proceedings of the 10th ACM Workshop on Hot Topics in Networks, p. 1-6, Nov. 14-15, 2011, Cambridge, Mass. (the "Reitblatt article"), it has been proposed that packets be tagged at network ingress with a version of the forwarding state used at the ingress. Hence, when the packet makes progress through the network, any subsequent network element knows which version to use. This effectively realizes transactional, network-wide updates for any network forwarding state.

However, this approach comes with a few practical challenges. First, without assuming slicing of the network, updates to the network have to be serialized. That is, the whole network has to be prepared for a particular version, then the ingresses are updated to use the prepared version, and only after that, the preparations for the next version can begin.

Second, the packet needs to have an explicit version tag and hence enough bits somewhere in the packet headers need to be allocated for the tag. If the network has a requirement to operate with legacy tunneling protocols, it might be challenging to find such free bits for the tag in the headers.

Hence, the network wide transactional updates as described in the Reitblatt article, while powerful, come with practical challenges that ideally should be avoided. Thus, instead of this approach described in the Reitblatt article, the network control system of some embodiments exploits placement of the managed forwarding elements on the edge of the network. The network control system of some embodiments makes the logical forwarding decisions (that is, decisions on which logical port(s) should receive the packet) at the first-hop, as described in Section I above. Any subsequent steps are merely forwarding the packet based on this forwarding decision towards the selected destination.

Figure 5:
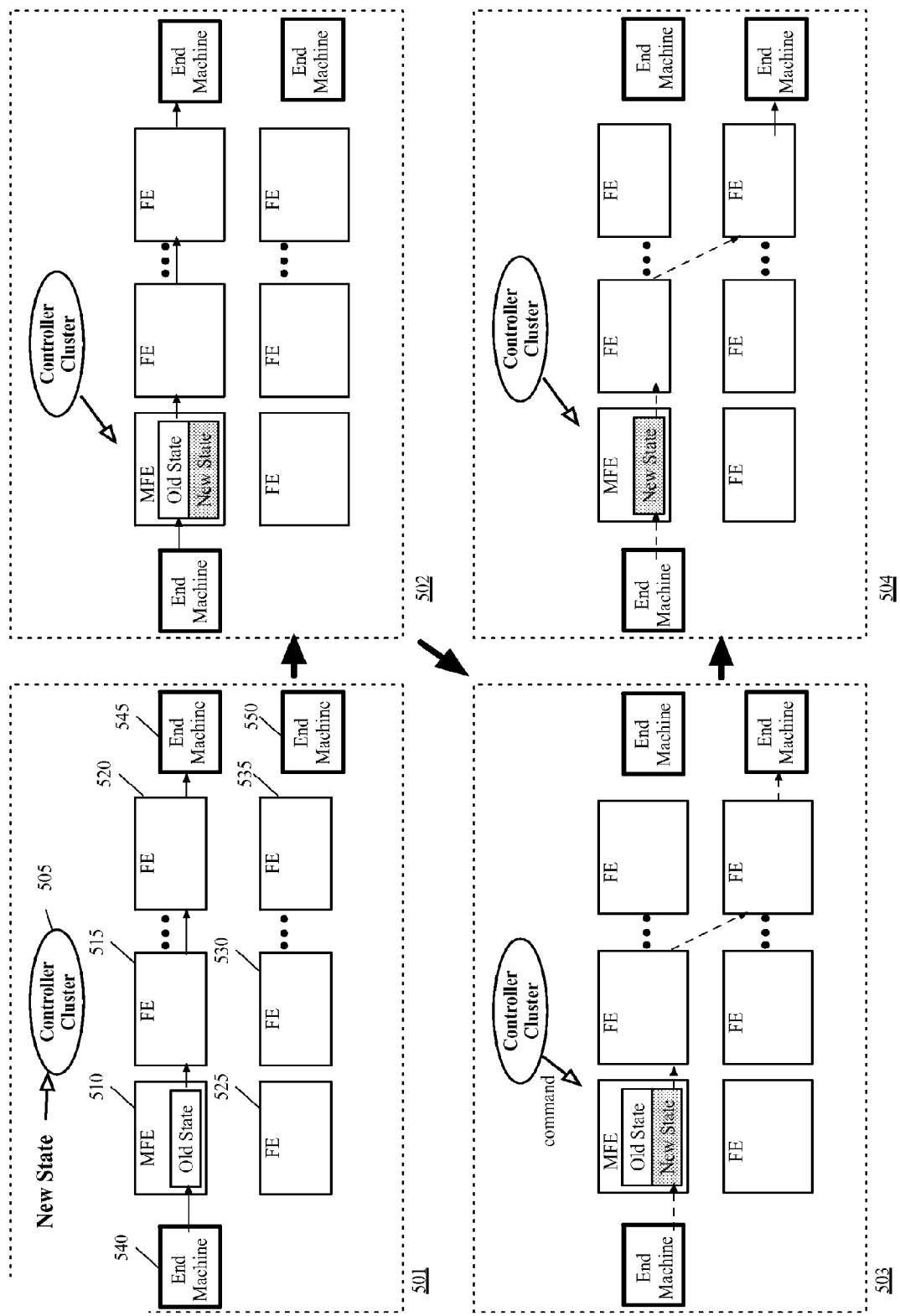
FIG. 5 illustrates sending updated forwarding state information to a set of managed forwarding elements.

FIG. 5 conceptually illustrates a network controller cluster 505 of a network control system that makes the logical forwarding decisions at the first-hop. Specifically, this figure illustrates in four different stages 501-504 that the network controller cluster 505 sends the forwarding state updates only to the first-hop managed forwarding elements. The network controller cluster 505 is similar to the network controller cluster 105 described above by reference to FIG. 1 in that the network controller cluster 505 includes logical controllers and physical controllers (not shown) that generate, update and propagate forwarding state to an managed forwarding element (MFE) 510. The managed forwarding element 510 is a first-hop forwarding element for the data that originates from an end machine 540. That is, the managed forwarding element 510 directly interfaces with the end machine 540 and forwards the data from the end machine 540 towards the destinations of the data. A set of forwarding elements 515-535 forward data between a set of end machines 540-550.

At the first stage 501, the managed forwarding element 510 forward network data (not shown) from the end machine 540 based on the current forwarding state (the old state) that the managed forwarding element has. Specifically, for a packet that sent from the end machine 540 to the end machine 545, the path defined by the controller cluster spans the forwarding elements (FEs) 510, 515, and 520 as indicated by the sold arrow lines. Also at stage 501, the controller cluster 505 receives updates to the forwarding state from the user (e.g., through an input translation controller, which is not depicted in this figure). The updates represent a new network policy (e.g., a new QoS policy defining a different allowable bandwidth, a new path from a VM to another VM that has been newly provisioned, etc.).

At the second stage 502, the controller cluster 505 computes the forwarding state updates (e.g., by converting the input LCP data into the UPCP or CPCP data). In some embodiments, the controller cluster 505 identifies all the managed forwarding elements that implement logical forwarding elements. In particular, for a path of a packet that will be forwarded from a first physical port to a second physical port that are mapped to a logical ingress port and a logical egress port of the logical forwarding elements, the controller cluster 505 identifies the forwarding element that has the first physical port (i.e., the first-hop forwarding element) and the forwarding element that has the second physical port (i.e., the last-hop forwarding element).

At the stage 502, the updated forwarding state has a new path for a packet that originates from the end machine 540 and is destined to the end machine 550, which is an end machine added to the network after the old forwarding state had been computed and propagated to the network forwarding elements. With respect to this new path, the managed forwarding element 510 is a first-hop managed forwarding element and the forwarding element 520 is the last-hop forwarding element. The forwarding element 515 is one of the "middle" managed and unmanaged forwarding elements that forward the packet towards the last-hop managed forwarding element 535.

The controller cluster 505 computes the updated forwarding state for all the paths affected by the user updates and identifies the first-hop managed forwarding element for each of these paths. At stage 502, the controller cluster 505 sends to the managed forwarding elements the updated forwarding state for the first-hop managed forwarding elements of the paths. For the simplicity of illustration, stage 502 shows the old and new forwarding state for those paths that start from the managed forwarding element 510. The managed forwarding element 510 has the old and new forwarding state for these paths. The managed forwarding element 510 does not use the new forwarding state yet and forwards packet based on the old forwarding state.

In some embodiments, the managed forwarding elements that are first-hop forwarding elements start using the new forwarding state when the managed forwarding elements receive the new forwarding state. However, in some embodiments, the controller cluster 505 sends a command to the managed forwarding elements to start using the updated forwarding state to forward packets as first-hop forwarding elements. At the third stage 503, the controller cluster 505 sends such a command to the managed forwarding the managed forwarding element 510. The managed forwarding element 510 uses the new forwarding state to perform as a first-hop forwarding element for the paths that begin at the managed forwarding element 510. For a new path for a packet sent from the end machine 540 to the end machine 550, the managed forwarding element 510 now can forward the packet based on the new forwarding state. Because the non-first-hop forwarding elements do not need and thus do not get the new forwarding state, the packet in these embodiments does not need to carry any version information to indicate that the non-first-hop forwarding elements should use the new forwarding state.

At the fourth stage 504, the managed forwarding elements 510-535 removes the old forwarding state. In some embodiments, the controller cluster 505 configures the managed forwarding element to remove the old forwarding state after a period of time elapses after receiving the new forwarding state. In other embodiments, the controller cluster 505 sends a command to the managed forwarding elements to remove the old forwarding state.

Figure 6:
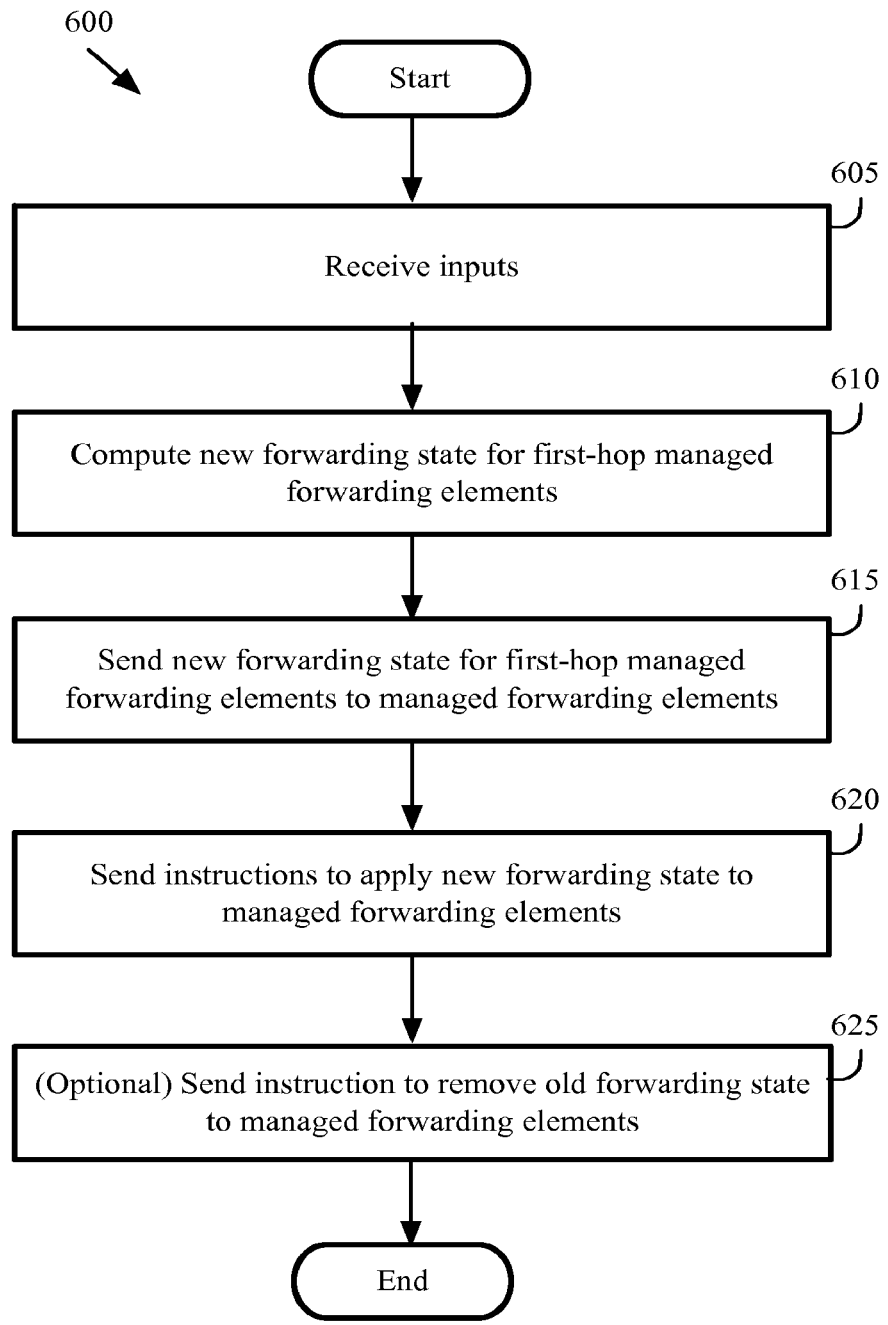
FIG. 6 conceptually illustrates a process that some embodiments perform to send updated forwarding state information to a set of managed forwarding elements.

FIG. 6 conceptually illustrates a process 600 that some embodiments perform to update and send the forwarding state to the managed forwarding elements. Specifically, the process 600 is for those embodiments where all logical forwarding decisions for forwarding packets are made in the first-hop managed forwarding elements. The process 600 in some embodiments is performed by a controller cluster (not shown), such as the controller cluster 105 or 505 of FIGS. 1 and 5.

The process 600 begins by receiving (at 605) inputs, which are updates to the forwarding state of the managed forwarding elements managed by the controller cluster. These updates to the forwarding state may appear for at least three reasons. First, when a logical policy changes because the network policy enforced by the logical pipeline is reconfigured by the user (e.g., by updating of access control lists), the forwarding state changes. Second, workload operational changes result in a change to the forwarding state. For instance, when a virtual machine migrates from a first node to a second node, the logical view remains unchanged. However, the forwarding state requires updating due to the migration, as the logical port to which a VM attaches is now at a different physical location. Third, physical reconfiguration events, such as managed forwarding element additions, removals, upgrades and reconfiguration, may result in changes to the forwarding state.

Next, the process 600 computes (at 610) the updated forwarding state based on the received inputs. The computation involves conversion of the LCP data to the LFP data and then from the LFP data into the UPCP or CPCP data. The updated LCP data may affect several logical forwarding elements. That is, the logical paths (i.e., the numerous logical paths between numerous pairs of logical ports of the affected logical forwarding elements) are removed, added, or modified, and therefore the physical paths implementing those affected logical paths are also removed, added, or modified.

In some embodiments, the logical forwarding operations of these affected logical forwarding elements are performed by the first-hop managed forwarding elements only. For instance, the controller cluster configures the first-hop managed forwarding elements to perform logical L2 forwarding operations of a first logical switch, logical L3 routing of a logical router, and logical L2 forwarding operations of a second logical switch that gets the packets routed by the logical router. Thus, the forwarding state that the process 600 of these embodiments computes is for the first-hop forwarding elements only. The middle and last-hop forwarding elements for these paths are used as fabric for forwarding the packets to the destination machines. Therefore, the forwarding state does not make the managed forwarding elements to add version information to the packets.

Next, the process 600 computes (at 610) the updated forwarding state for operating as the first-hop forwarding elements to the managed forwarding elements. The process 600 then sends (at 615) the updated forwarding state to the managed forwarding elements. The managed forwarding elements now have both the old and updated forward state.

The process 600 optionally sends (at 625) a command to the managed forwarding elements to remove the old forwarding state from the managed forwarding elements. In some embodiments, instead of sending an explicit command to switch over to the new forwarding state, the controller cluster configures the managed forwarding elements to replace the old forwarding state with the new forwarding state or remove the old forwarding state as soon as the managed forwarding element receives the new forwarding state. Alternatively or conjunctively, the controller cluster configures the managed forwarding elements to remove the old forwarding state after a certain period of time elapses after receiving the new forwarding state, instead of sending the command to the managed forwarding elements. The process then ends.

Figure 7:
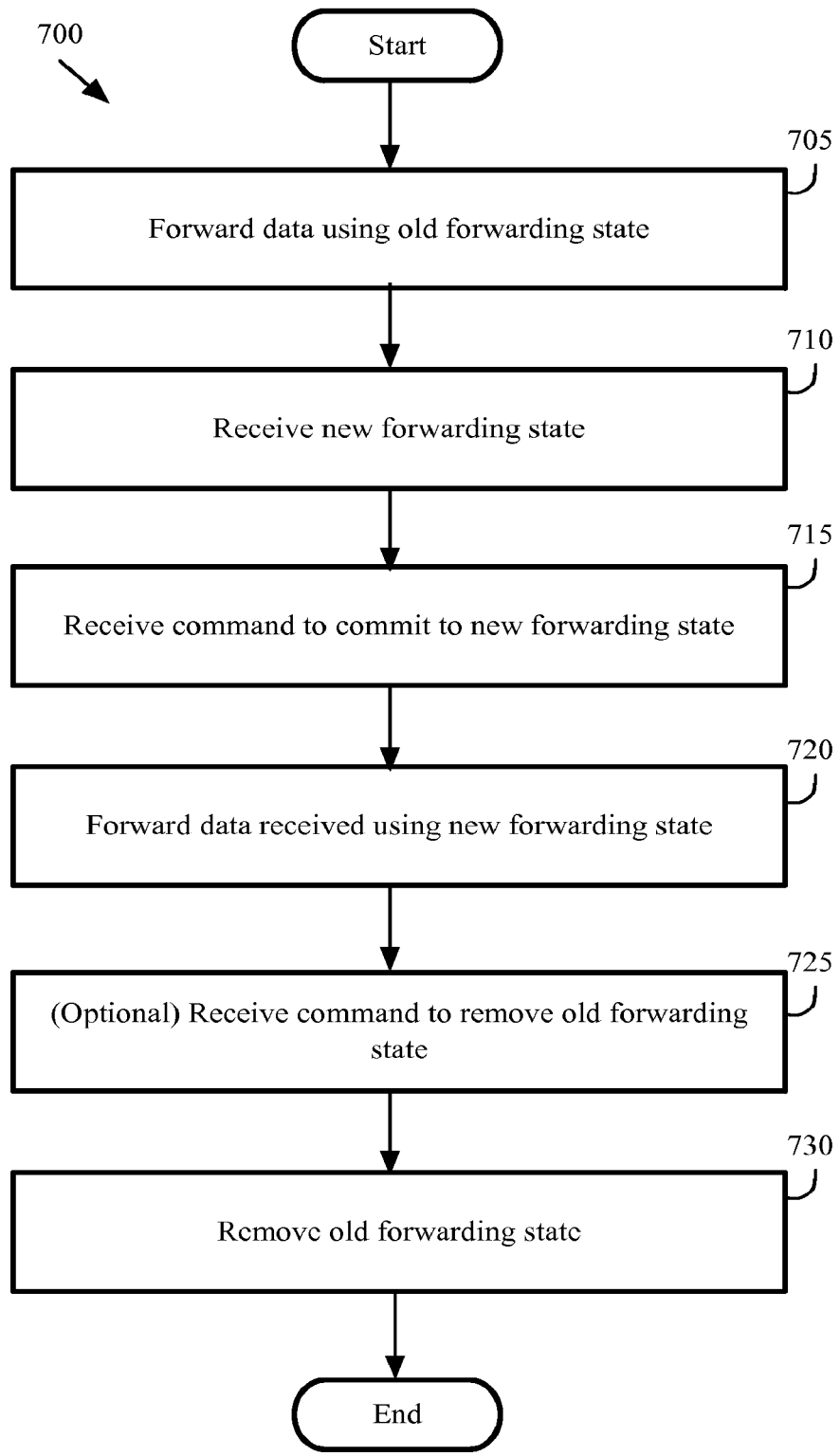
FIG. 7 conceptually illustrates a process that some embodiments perform to receive the updated forwarding state at a managed forwarding element.

While FIG. 6 illustrates the process 600 that is performed by the network controller cluster of some embodiments, FIG. 7 illustrate a process that is performed by a managed forwarding element of some embodiments. FIG. 7 conceptually illustrates a process 700 that some embodiments perform to forward data. The process 700 is performed by a managed forwarding element that uses forwarding state for operating as first-hop forwarding element.

The process begins by forwarding (at 705) the incoming packets using the current forwarding state (the old forwarding state). The incoming packets are from the end machines that the managed forwarding element directly interfaces. The forwarding state is received from a controller cluster or a chassis controller that manages the managed forwarding element by sending the forwarding state to the managed forwarding element.

Next, the process 700 receives (at 710) updated forwarding state from the controller cluster. This forwarding state is updated by the controller cluster and includes the CPCP data converted from the LCP data. In some embodiments, the controller sends the updated forwarding element to the first-hop managed forwarding element after the managed forwarding elements that operate as non-first-hop forwarding elements receive the updated forwarding state. The managed forwarding element now has both the old forwarding state and the updated forwarding state.

The process 700 then receives (at 715) a command from the controller cluster to start using the updated forwarding state to forward the incoming data. Upon receiving the command, the first-hop managed forwarding element of some embodiments switches over to the updated forwarding state from the old forwarding state. In some embodiments, this command could be implicit. That is, the first-hop managed forwarding element uses the new forwarding state as soon as the new forwarding state is installed in the first-hop managed forwarding element without having received an explicit command to switch over to the new forwarding state.

The process 700 then forwards (at 720) the incoming packets using the updated forwarding state. The non-first-hop managed forwarding elements that gets the packets from the first-hop managed forwarding element will use the updated forwarding state to forwarding these packets. In some embodiments, the process 700 adds version information to the packets so that the non-first-hop managed forwarding elements can select the new forwarding state to use to forward the packets from the first-hop managed forwarding element.

At 725, the process 700 optionally receives a command from the controller cluster to remove the old forwarding state. In some embodiments, the managed forwarding element does not receive an explicit command to remove the old state. Instead, the managed forwarding element is configured by the controller cluster to remove the old forwarding state after a certain period of time elapses after receiving the updated forwarding state. The process 700 then removes (at 730) the old forwarding state. The process then ends.

The network control system of some embodiments makes the logical forwarding decisions (that is, decisions on which logical port(s) should receive the packet) at the first-hop as well as the non-first-hops, as described in Section I above. In some of these embodiments, transactional updates across the network are split into two parts: (1) transactional updates to the first-hop managed forwarding element, and (2) transactional updates to the path through the network from the first-hop managed forwarding element to the last-hop managed forwarding element. As long as these two can be implemented, the global transactions can be provided. That is, by preparing any new required paths before updating the first-hop with the new policies, the overall state update becomes atomic. After these two steps, any network paths not required by the new first-hop state configuration can be removed.

Figure 8:
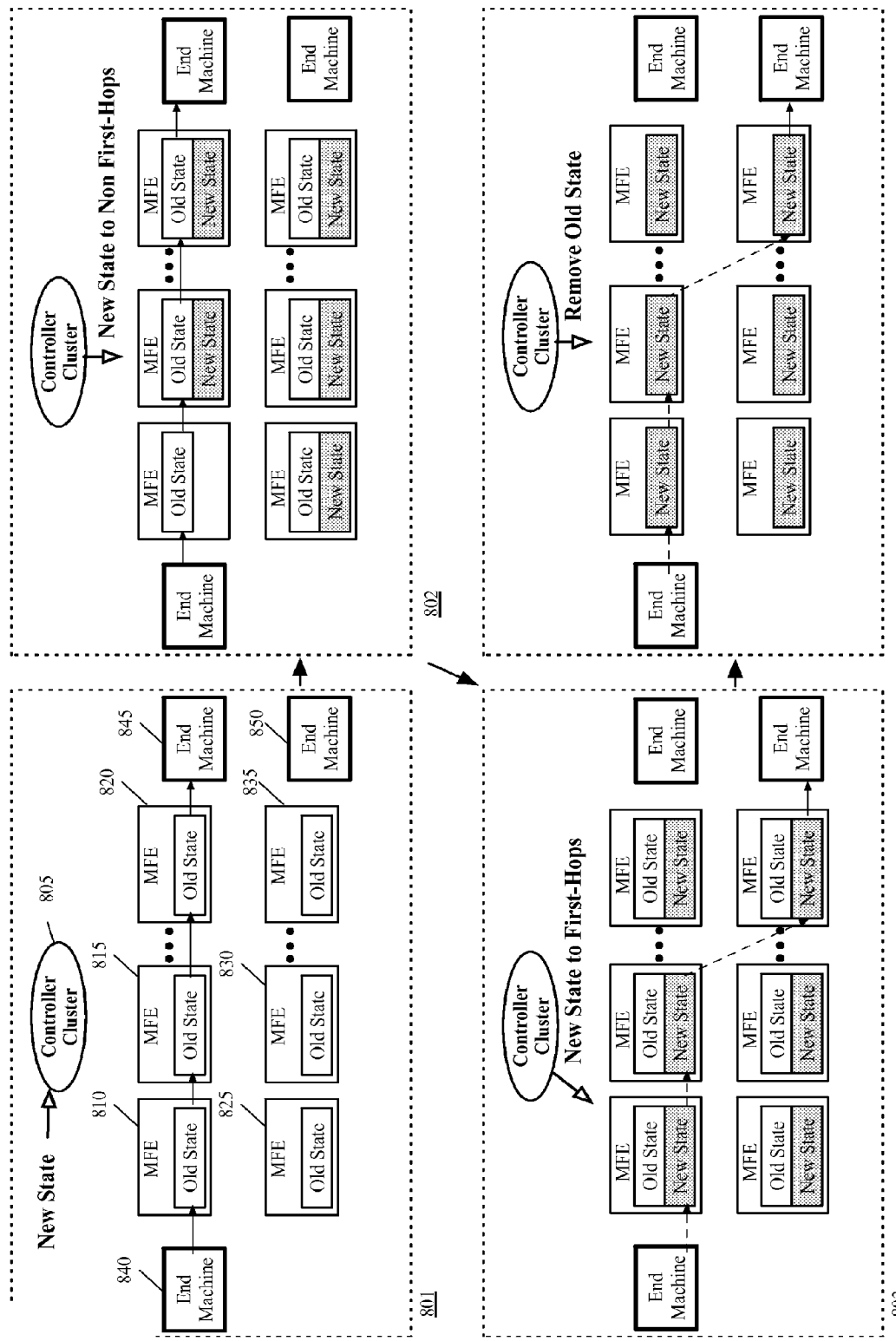
FIG. 8 illustrates sending updated forwarding state information to a set of managed forwarding elements.

FIG. 8 conceptually illustrates a network controller cluster 805 of a network control system that employs this two-step approach. Specifically, this figure illustrates in four different stages 801-804 that the network controller cluster 805 sends the forwarding state updates in two parts to two groups of managed forwarding elements. The network controller cluster 805 is similar to the network controller cluster 105 described above by reference to FIG. 1 in that the network controller cluster 805 includes logical controllers and physical controllers (not shown) that generate, update and propagate forwarding state to a set of managed forwarding elements 810-835. The managed forwarding elements 810-835 forward network data (not shown), based on the forwarding state received from the network controller cluster 805, between a set of end machines 840-850.

At the first stage 801, the managed forwarding elements 810-835 forward network data (not shown) based on the current forwarding state (the old state) that the managed forwarding elements have. Specifically, for a packet that sent from the end machine 840 to the end machine 845, the path defined by the controller cluster spans the managed forwarding elements (MFEs) 810, 815, and 820 as indicated by the sold arrow lines. Also at stage 801, the controller cluster 805 receives updates to the forwarding state from the user (e.g., through an input translation controller, which is not depicted in this figure). The updates represent a new network policy (e.g., a new QoS policy defining a different allowable bandwidth, a new path from a VM to another VM that has been newly provisioned, etc.).

At the second stage 802, the controller cluster 805 computes the forwarding state updates (e.g., by converting the input LCP data into the UPCP or CPCP data). In some embodiments, the controller cluster 805 identifies all the managed forwarding elements that implement logical forwarding elements. In particular, for a path of a packet that will be forwarded from a first physical port to a second physical port that are mapped to a logical ingress port and a logical egress port of the logical forwarding elements, the controller cluster 805 identifies the managed forwarding element that has the first physical port (i.e., the first-hop managed forwarding element) and the managed forwarding element that has the second physical port (i.e., the last-hop managed forwarding element). For this path, the controller cluster 805 then categorizes the first-hop managed forwarding element in one group and the last-hop managed forwarding element as well as other managed forwarding elements that are in the path of the packet in another group.

For instance, the updated forwarding state has a new path for a packet that originates from the end machine 840 and is destined to the end machine 850, which is an end machine added to the network after the old forwarding state had been computed and propagated to the network forwarding elements. With respect to this new path, the managed forwarding element 810 is a first-hop managed forwarding element and the managed forwarding element 820 is the last-hop manage forwarding element. The managed forwarding element 815 is one of the "middle" managed and unmanaged forwarding elements (not shown) that forward the packet towards the last-hop managed forwarding element 835.

The controller cluster 805 computes the updated forwarding state for all the paths affected by the user updates and identifies the first-hop managed forwarding element and the non-first-hop managed forwarding elements for each of these paths. At stage 802, the controller cluster 805 sends the updated forwarding state for the non-first-hop managed forwarding elements of the paths. For the simplicity of illustration, stage 802 shows the old and new forwarding state for those paths that start from the managed forwarding element 810. Hence, the managed forwarding element 810 has the old forwarding state only and the other managed forwarding elements have both the old and new forwarding state for these paths. For the new path for a packet sent from the end machine 840 to the end machine 850, the first-hop managed forwarding element 820 is not yet capable of forwarding the packet correctly because the managed forwarding element 820 does not have the forwarding state to forward the packet towards the destination machine 850 (i.e., the mapping between the logical egress port and a physical port of the managed forwarding element 850 is missing at the first-hop forwarding element 810).

At the third stage 803, the controller cluster 805 sends the computed updates for the first-hop forwarding elements for all the paths. The managed forwarding element 810 now has the new forwarding state to perform as a first-hop forwarding element for the paths that begin at the managed forwarding element 810. For the new path for a packet sent from the end machine 840 to the end machine 850, the managed forwarding element 810 now can forward the packet correctly based on the new forwarding state.

In some embodiments, the managed forwarding elements that are first-hop forwarding elements start using the new forwarding state when the managed forwarding elements receive the new forwarding state. However, in some embodiments, the controller cluster 805 sends a command to the managed forwarding elements to start using the updated forwarding state to forward packets as first-hop forwarding elements.

In some embodiments, the managed forwarding elements, operating as first-hop forwarding elements for those packets that the managed forwarding elements receive directly from the source machines, adds version information to the packets. In some embodiments, the managed forwarding elements use a particular binary bit of a packet as the version indicator or adds one more bit to each packet to store the version information. In some such embodiments, this version bit alternates its value whenever the managed forwarding element switches to a newer version of forwarding state updates. The non-first-hop managed forwarding elements then use the old or new forwarding state based on the version information that the packets are carrying. In this manner, a particular packet is forwarded based on one of the old or new forwarding state and not a mixture of old and new forwarding state.

At the fourth stage 804, the managed forwarding elements 810-835 removes the old forwarding state. In some embodiments, the controller cluster 805 configures the managed forwarding element to remove the old forwarding state after a period of time elapses after receiving the new forwarding state. In other embodiments, the controller cluster 805 sends a command to the managed forwarding elements to remove the old forwarding state.

The four stages 801-804 in FIG. 8 are shown in terms of updates for one old path and one new path. Because there may be many other paths defined for implementing the logical forwarding elements, the controller cluster 805 and the managed forwarding elements 810-835 perform the two-step process described in terms of the four stages 801-804 for all the paths affected by the user updates. The next figure, FIG. 9, conceptually illustrates a process 900 that some embodiments perform to send the updates to the managed forwarding elements for all paths updated or created. The process 900 in some embodiments is performed by a controller cluster (not shown), such as the controller cluster 105 or 805 of FIGS. 1 and 8.

The process 900 begins by receiving (at 905) inputs, which are updates to the forwarding state of the managed forwarding elements managed by the controller cluster. These updates to the forwarding state may appear for the three reasons discussed above.

Next, the process 900 computes (at 910) the updated forwarding state based on the received inputs. The computation involves conversion of the LCP data to the LFP data and then from the LFP data into the UPCP or CPCP data. The updated LCP data may affect several logical forwarding elements, including logical L2 switches and logical L3 routers. That is, the logical paths (i.e., the numerous logical paths between numerous pairs of logical ports of the affected logical forwarding elements) are removed, added, or modified, and therefore the physical paths implementing those affected logical paths are also removed, added, or modified.

Hence, the updated forwarding state are for both the fist-hop forwarding elements and the non-first-hop managed forwarding elements for all the affected physical paths.

The process 900 then identifies (at 915) the new forwarding state for the managed forwarding elements to operate as non-first-hop managed forwarding elements. This forwarding state is for those managed forwarding elements that are in the paths affected by the inputs but are not the first-hop managed forwarding elements of the paths.

In some embodiments, only the first-hop and the last-hop managed forwarding elements need forwarding state updates. In some of these embodiments, the logical forwarding elements affected by the inputs are implemented by the first-hop and the last-hop managed forwarding elements only. For instance, the controller cluster configures the first-hop managed forwarding elements to perform logical L2 forwarding operations (e.g., logically forwarding packets based on MAC addresses of the packets) of a first logical switch and perform logical L3 routing operations (e.g., logically routing the packets based on IP addresses of the packets) of a logical router. The controller cluster configures the last-hop managed forwarding elements to perform logical L2 forwarding operations of a second logical switch that gets the packets routed by the logical router. In these embodiments, the new forwarding state identified (at 915) is for the last-hop managed forwarding element of the affected paths. The forwarding elements in the middle of these paths are used as fabric for connecting the first-hop and the last-hop managed forwarding element. At 915, the process 900 also sends the identified forwarding state for the non-first-hop forwarding elements to the non-first-hop managed forwarding elements.

The process 900 then identifies (at 920) the new forwarding state for the managed forwarding elements to operate as first-hop managed forwarding elements. This forwarding state is for those managed forwarding elements that are first-hop forwarding elements in the affected paths. At 920, the process 900 also sends the identified forwarding state for the first-hop forwarding elements to the first-hop managed forwarding elements.

In some embodiments, updating the forwarding state does not have to be ordered globally. Only serializing the updates per first-hop element is required. That is, if multiple first-hop elements require forwarding state updates, their updates can proceed in parallel, independently. Only the computation has to be transactional.

In some embodiments, the network control system uses the approach described in the Reitblatt article for updating the network-wide state in some cases, where the forwarding state for the non-first-hop forwarding elements of the paths changes enough that the old and new paths would be mixed. For instance, this could happen when the addressing scheme of the path labels change between software versions (of network controllers). For that kind of condition, the controller cluster dedicates a network-wide version bit (or a few bits) from the beginning of the path label/address, so that the structure of the path addressing can be changed if necessary. Having said this, one should note that as long as the label/address structure does not change, the network wide updates can be implemented as described above by adding new paths and then letting the first-hop managed forwarding elements migrate to the new paths after the rest of the paths is ready.

Having sent the updated forwarding state for the first-hop and non-first-hop forwarding elements to the managed forwarding elements, the process 900 determines (at 925) whether the process 900 has received confirmations from all of the managed rewarding elements that the process send the updated forwarding state. The confirmation indicates that the managed forwarding element received the updated forwarding state from the controller cluster. In some embodiments, the process 900 sends the forwarding state for the first-hop forwarding elements to the managed forwarding elements only after each of the managed forwarding elements that received the updated forwarding state for non-first-hop forwarding elements sends back a confirmation. The process 900 of these embodiments then waits for a confirmation from each of the managed forwarding elements that received the updated forwarding state for the first-hop managed forwarding elements.

When the process 900 determines (at 925) that not all of the managed forwarding elements that received the updated forwarding state sent back confirmations, the process 900 loops back to 925 to wait for the confirmations. In some embodiments, however, the process 900 proceeds to 930 after a certain period of time elapses after the process sends the updated forwarding state to the managed forwarding elements.

When the process 900 determines (at 925) that all of the managed forwarding elements that received the updated forwarding stated sent back confirmations, the process 900 of some embodiments sends (at 930) a command to the managed forwarding elements to apply the updated forwarding state for first-hop forwarding elements. In some embodiments, when the managed forwarding elements forwards packets using the updated forwarding state, the managed forwarding elements includes version information (e.g., a version bit) in the packets so that the non-first-hop managed forwarding elements forward these packets using the updated forwarding state.

The process 900 then optionally sends (at 935) a command to the managed forwarding elements to remove the old forwarding state from the managed forwarding elements. In some embodiments, the controller cluster configures the managed forwarding elements to remove the old forwarding state after a certain period of time elapses after receiving the new forwarding state, instead of sending the command to the managed forwarding elements. The process then ends.

Figure 9:
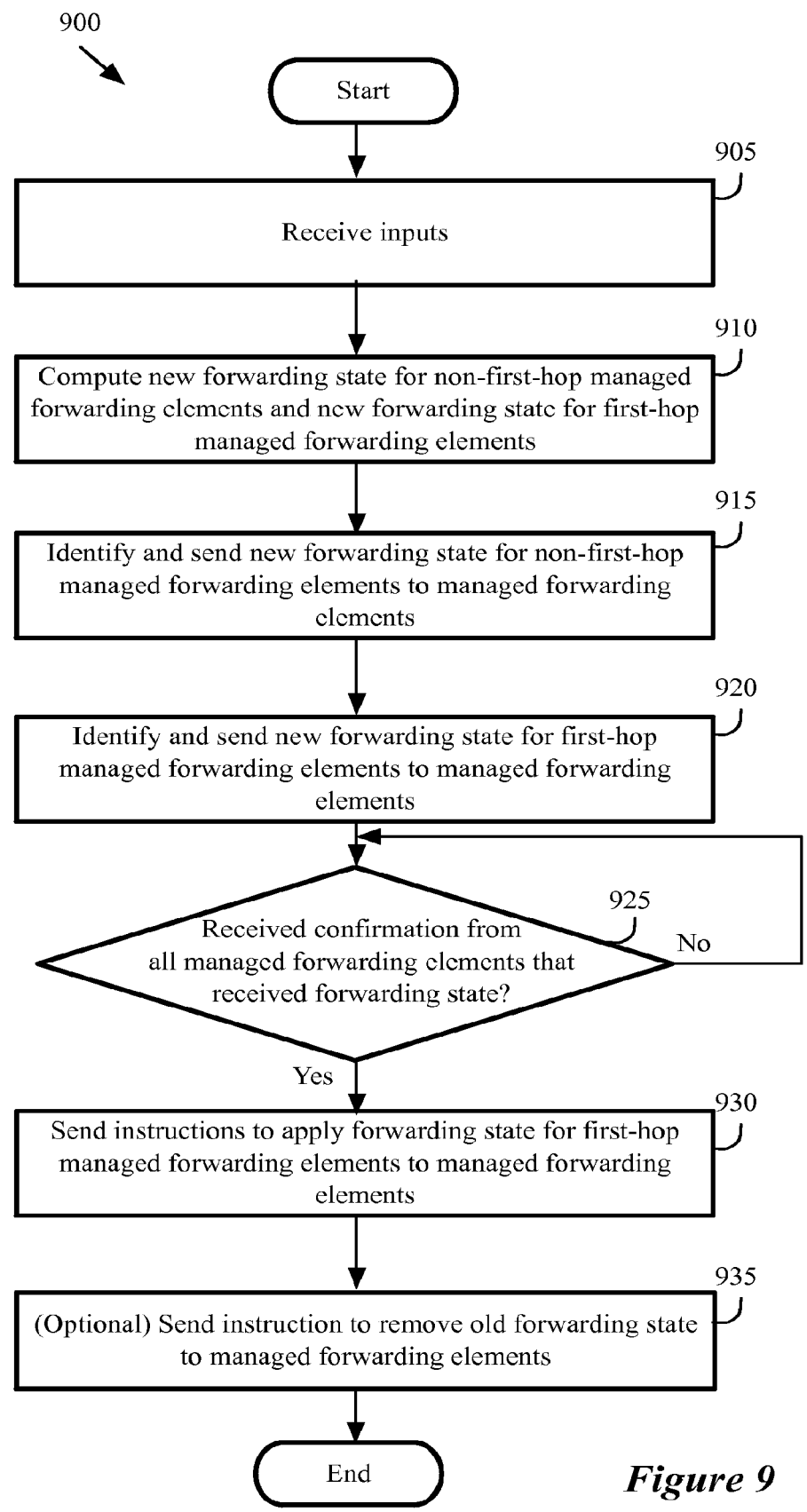
FIG. 9 conceptually illustrates a process that some embodiments perform to send updated forwarding state information to a set of managed forwarding elements.
Figure 10:
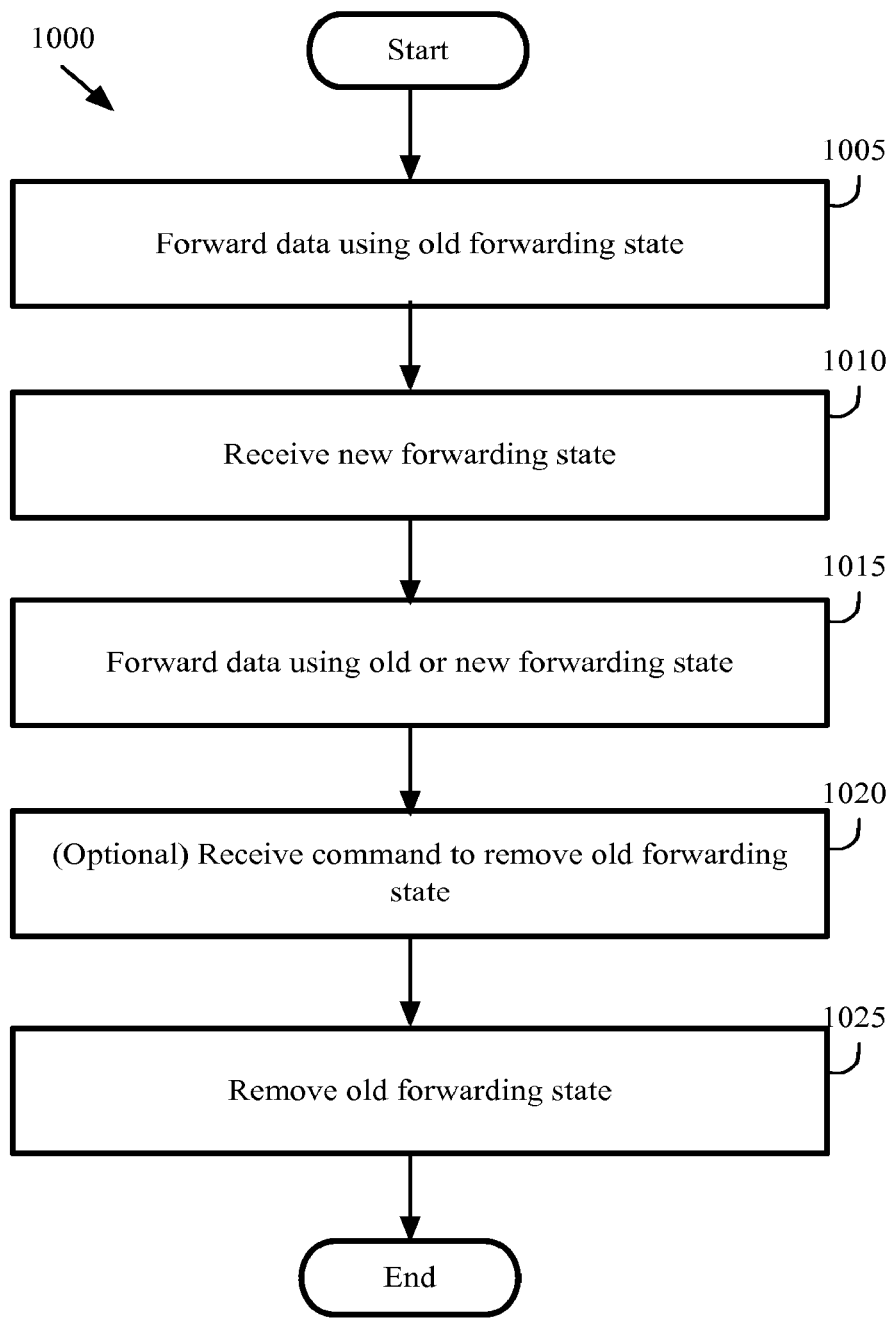
FIG. 10 conceptually illustrates a process that some embodiments perform to receive the updated forwarding state at a managed forwarding element.

FIG. 9 illustrates the process 900 that is performed by the network controller cluster of some embodiments, the next Figure, FIG. 7 illustrates a process that is performed by a managed forwarding element of some embodiments. FIG. 10 conceptually illustrates a process 1000 that some embodiments perform to forward data. The process 1000 is performed by a managed forwarding element that uses forwarding state for operating as non-first-hop forwarding element.

The process 1000 begins by forwarding (at 1005) the incoming packets using the current forwarding state (the old forwarding state). The incoming packets are not from the end machines that the managed forwarding element directly interfaces. That is, the managed forwarding element is in the paths of these packets but not as the first-hop forwarding elements for the packets. The forwarding state is received from a controller cluster or a chassis controller that manages the managed forwarding element by sending the forwarding state to the managed forwarding element.

Next, the process 1000 receives (at 1010) updated forwarding state from the controller cluster. This forwarding state is updated by the controller cluster and includes the CPCP data converted from the LCP data in some embodiments. The managed forwarding element now has both the old forwarding state and the updated forwarding state.

The process 1000 then forwards (at 1015) incoming packets using the old or updated forwarding state. In some embodiments, the process 1000 selects the old or updated forwarding state to use to forwarding the incoming packets based on the version information that the incoming packets carry. That is, this version information is used to match the version information that the old forwarding state and the updated forwarding state installed in the managed forwarding element have.

At 1020, the process 1000 optionally receives a command from the controller cluster to remove the old forwarding state. In some embodiments, the managed forwarding element does not receive an explicit command to remove the old state. Instead, the managed forwarding element is configured by the controller cluster to remove the old forwarding state after a certain period of time elapses after receiving the updated forwarding state. The process 1000 then removes (at 1025) the old forwarding state. The process then ends.

C. Modeling the External Dependencies

The discussion above considered the requirements that are to be placed on the transactionality in the network control system and the implementation of transaction updates across the network (e.g., by separating the updates to the first-hop processing from the updates to the non-first-hop processing). The network control system also transactionally computes the update to the network forwarding state.

Clearly, before updating anything transactionally, the network control system lets the computation converge given the policy changes. As described above, the network control system of some embodiments uses an nLog table mapping engine to implement the network controllers of the system. The nLog engine in some embodiments lets the computation reach its fixed point—that is, the nLog engine computes all the changes to the forwarding state based on the input changes received so far.

At the high-level, reaching a local fixed point is simple: it is sufficient to stop feeding any new updates to the computation engine (i.e., the nLog engine), and to wait until the engine has no more work to do. However, in networking, the definition of a fixed point is a bit wider in its interpretation: while the computation may reach a fixed point, it does not mean that the computation reached an outcome that can be pushed further down towards the managed forwarding elements. For example, when changing the destination port of a tunnel, the UPCP data may only have a placeholder for the physical port that the destination port maps to.

It turns out that the computation may depend on external changes that have to be applied before the computation can finish and reach a fixed point that corresponds to a forwarding state that can be used and pushed down. To continue with the example, the placeholder for the port number in the flow entry may only be filled after setting up a tunnel port that will result in a port number. In this case, the UPCP computation cannot be considered finished before the dependencies to any new external state (e.g., port numbers due to the created tunnel) are met.

Hence, these external dependencies have to be considered in the computation and included into the consideration of the fixed point. That is, a fixed point is not reached until the computation finishes locally and no external dependencies are still unmet. In some embodiments, the nLog computation is built on adding and removing intermediate results; every modification of the configuration or to the external state results in additions and removals to the computed state.

In order to consider the external dependencies in the UPCP computation, the nLog computation engine should:

(1) when a modification results in a state that should be added before the new UPCP data can be pushed down (e.g., when a tunnel has to be created to complete a UPCP flow entry), let the modification be applied immediately. The nLog computation engine has to consider fixed point unreachable until the results (e.g., the new port number) of the modification are returned to the nLog computation engine.

(2) when a modification results in a state that would affect the current UPCP data (e.g., removing an old tunnel), though, the update cannot be let through before the transaction is committed (i.e., the new network forwarding state is implemented). It should be applied only after the transaction has been committed. Otherwise, the network forwarding could change before the transaction is committed. Supporting atomic modification of an external resource cannot be done with the above rules in place. Fortunately, most of the resource modifications can be modeled as additions/removals; for instance, in the case of changing the configuration of a port representing a tunnel towards a particular destination, the new configuration can be considered as a new port, co-existing transiently with the old port.

Hence, at the high-level, the above approach builds on the ability to add a new configuration next to the old one. In the case of networking managed resources within the paths, this is typically the case. In the case that constraints exist (say, for some reason, two tunnels towards the same IP cannot exist), the approach does not work and the atomicity of such changes cannot be provided.

Figure 11:
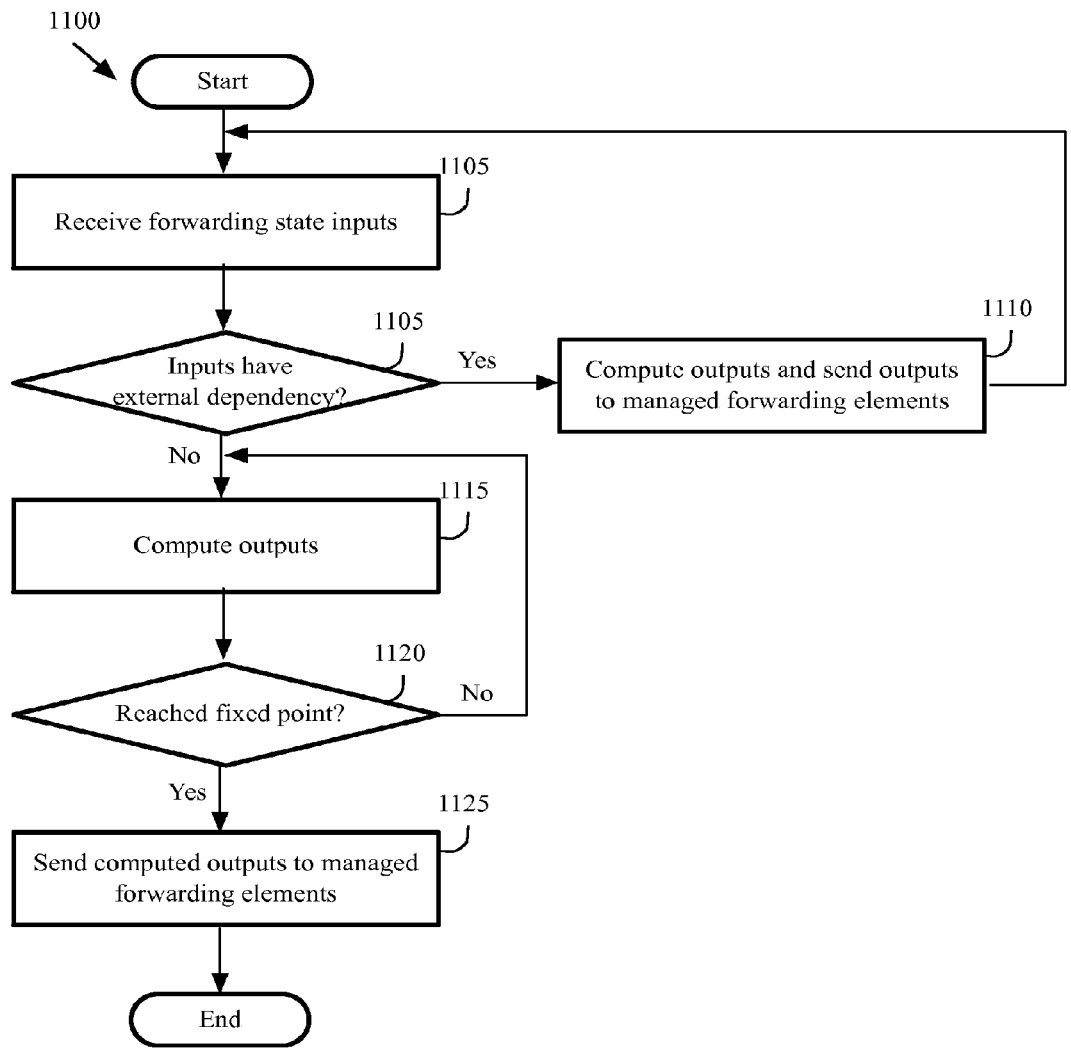
FIG. 11 conceptually illustrates a process that some embodiments perform to transactionally compute and send forwarding state to a set of managed forwarding elements.

FIG. 11 conceptually illustrates a process 1100 that some embodiments perform to transactionally compute and send forwarding state to a set of managed forwarding elements. In some embodiments, the process 1100 is performed by a physical controller or a chassis controller that receives UPCP data and translates the UPCP data into the CPCP data. The process begins by receiving (1105) a set of forwarding state changes (e.g., data tuples) containing UPCP data from a logical controller or a physical controller.

The process 1100 then determines (at 1105) whether the received changes have external dependencies. In some embodiments, the changes have external dependencies when the controller processing the changes does not have full information to process the changes and have to get the missing information from another controller or from managed forwarding elements. For instance, in order to translate UPCP changes that specify that the managed forwarding element should establish a tunnel from a port of the managed forwarding element to CPCP changes, the actual port number of the port is needed in the CPCP changes. Therefore, the CPCP changes cannot be created until the actual port number is received from the managed forwarding element.

When the process 1100 determines (at 1105) that the received changes do not have external dependencies, the process 1100 proceeds to 1115, which will be described further below. When the process 1100 determines (at 1105) that the change has external dependencies, the process 1100 computes (at 1110) a set of output changes based on the received changes that have external dependencies and sends the computed changes to the managed forwarding elements. This set of output changes requests for the missing information from the managed forwarding elements. The process 1100 then loops back to 1105 to receive more changes from the logical controller or the physical controller, or from the managed forwarding elements that may send back the missing information to resolve the external dependencies.

When the process 1100 determines (at 1105) that the received changes do not have external dependencies, the process 1100 computes (1110) a set of output changes (e.g., by translating the UPCP changes into the CPCP changes) and then determines (at 1115) whether the process 1100 has reached a fixed point, which would indicate an end of transactional computation of the output changes. In other words, the process 1100 determines whether the received changes have been completely processed and the process 1100 has no more input changes to process for now.

When the process 1100 determines (at 1115) that the process has not reached a fixed point, the process 1100 loops back to 1115 to keep computing output changes based on the input changes. Otherwise, the process 1125 sends the output changes to the managed forwarding elements. The process then ends.

D. Communication Requirements for Transactional Updates

The discussion above noted that it is sufficient to compute the updates in a transactional manner, and then push them to the first-hop edge forwarding elements. Hence, in addition to the computation, one more additional requirement is imposed to the system: transactional communication channels.

Accordingly, in some embodiments, the communication channel towards the forwarding elements (e.g., communication channels from input translation controllers to logical controllers, from logical controllers to physical controllers, from physical controllers to chassis controllers or managed forwarding elements, and/or from chassis controllers to managed forwarding elements) supports batching changes to units that are applied completely or not at all. In some of these embodiments, the communication channel only supports the concept of the "barrier" (i.e., start and end tags), which signals the receiver regarding the end of the transaction. A receiving controller or managed forwarding element merely queues the updates until it receives a barrier as described above. In addition, the channel has to maintain the order of the updates that are sent over, or at least guarantee that the updates that are sent before a barrier do not arrive at the receiver after the barrier.

In this manner, the sending controller can simply keep sending updates to the state as the computation makes progress and once it determines that the fixed point has been reached, it signals the receiving first-hop forwarding elements about the end of the transaction. As further described below, the communication channel in some embodiments also supports synchronous commits, so that the sending controller knows when a transaction has been processed (computed by reaching a fixed point) and pushed further down (if required). One should note that this synchronous commit may result in further synchronous commits internally, at the lower layers of the network control system, in the case of nested transactions as discussed below.

Having described achieving a network-wide transaction, Section III below describes achieving a transaction over several channels towards a managed forwarding element.

III. Nesting Transactions

By separating the beginning of the network from the rest of the network when it comes to the forwarding state updates as described above by reference to FIGS. 5-10, the network control system of some embodiments effectively creates a nested transaction structure: one global transaction can be considered to include two sub-transactions, one for first-hop ports and one for non-first-hop ports. The approach remains the same irrespective of whether the solution manages the non-first-hop ports at the finest granularity (by knowing every physical hop in the middle of the network and establishing the required state) or assumes an external entity can establish the connectivity across the network in a transactional manner.

In some embodiments, this generalizes to a principle that allows for creation of basic distributed transactions from a set of more fine-grained transactions. In particular, consider a managed forwarding element that has multiple communication channels towards a controller, with each channel providing transactionality but no support for transactions across the channels. That is, the channels have no support for distributed transactions. In such a situation, the very same composition approach works here as well. None of the other channels' state is used as long as one of the channels that can be considered as a primary channel gets its transaction applied. With this sort of construction, the secondary channels can again be 'prepared' before the primary channel commits the transaction (just like the non-first-hop managed forwarding elements were prepared before the first-hop managed forwarding elements committed its transaction). In this manner, the net result is a single global transaction that gets committed as the transaction at the first-hop managed forwarding element gets committed.

Figure 12:
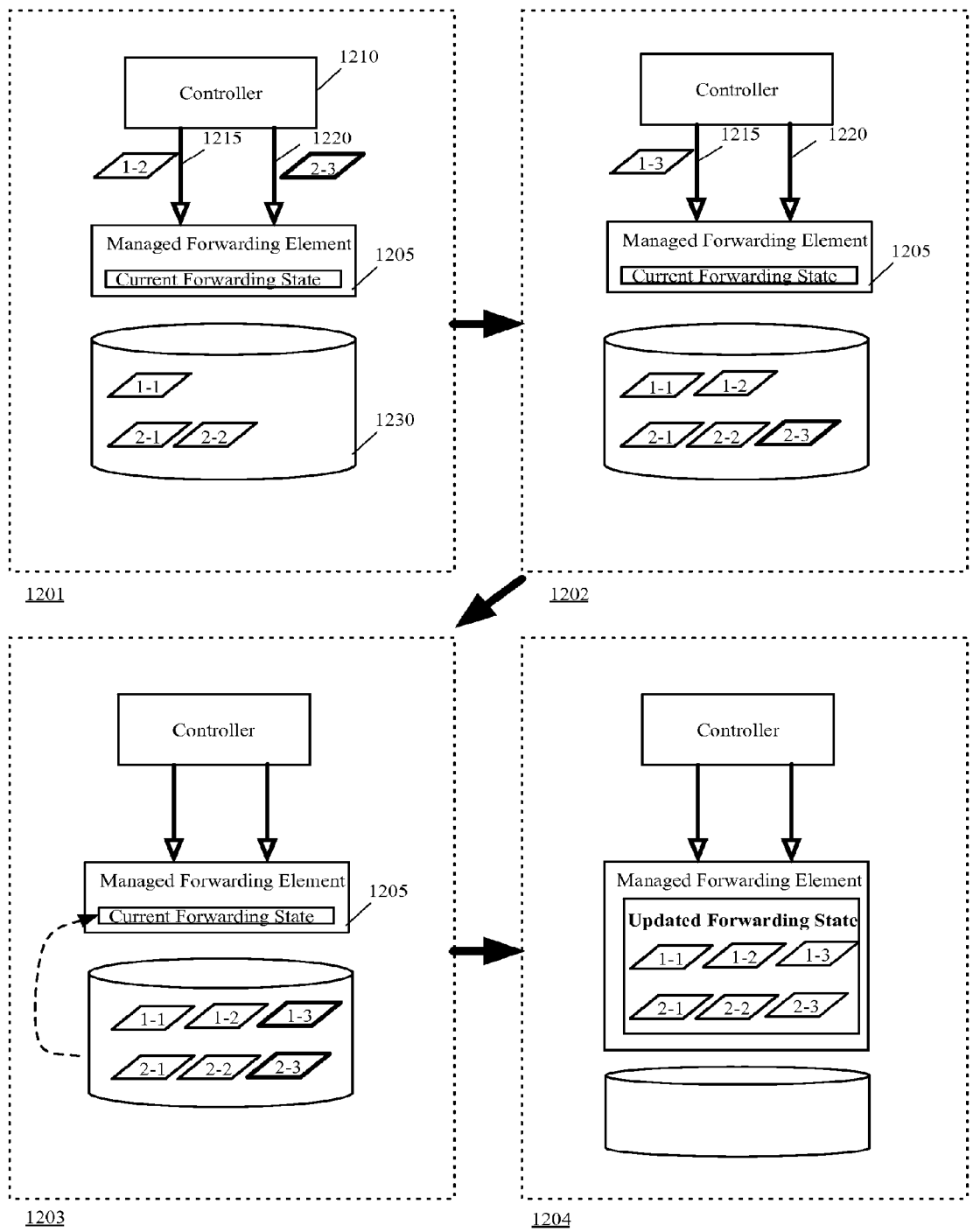
FIG. 12 illustrates a managed forwarding element to which several controllers of a controller cluster have established several communication channels to send updates to the managed forwarding element.

FIG. 12 illustrates a managed forwarding element 1205 to which a controller 1210 have established two channels 1215 and 1220 to send updates to the managed forwarding element 1205. In particular, this figure illustrates in four different stages 1201-1204 that the managed forwarding element 1205 does not use updates received through the channels until the updates from the channel 1215 arrive.

The controller 1210 is similar to the controller 200 of FIG. 2. In some embodiments, the controller 1210 is a physical controller that converts UPCP data to CPCP data. In other embodiments, the controller 1210 is a chassis controller that converts UPCP data received from a physical controller into CPCP data.

In some embodiments, the controller 1210 establishes the two channels 1215 and 1220 with the managed forwarding element 1205. The channel 1215 is established using a communication protocol for controlling the forwarding plane (e.g., forwarding tables) of the managed forwarding element 1205. For instance, the OpenFlow protocol provides commands for adding flow entries to, removing flow entries from, and modifying flow entries in the managed forwarding element 1205. The channel 1220 is established using a configuration protocol. The managed forwarding element 1205 receives configuration information through the channel 1220. In some embodiments, the managed forwarding element 1205 stores the configuration information in a configuration database (not shown). In some embodiments, configuration information includes information for configuring the managed forwarding element 1205, such as information for configuring ingress ports, egress ports, QoS configurations for ports, etc. For simplicity of illustration and discussion, flow entries and configuration information are illustrated and referred to as forwarding state for this figure.

The managed forwarding element 1205 directly interfaces several end machines (not shown) and forward data to and from the end machines using the forwarding state received from the controller 1205 through the two channels. Neither of these two channels supports distributed transactions but the managed forwarding element 1205 achieves distributed transactions across these two channels by nesting (batching) a transaction from the channel 1220 into a transaction from the channel 1215, or vice versa. For instance, in some embodiments, the managed forwarding element 1205 the channel 1215 as a primary channel and the channel 1220 as secondary channel. The managed forwarding element 1205 holds the application of the forwarding state received through the channels until the managed forwarding element 1205 receives a transaction through the primary channel.

At the first stage 1201, the managed forwarding element 1205 has received a set of changes (e.g., data tuples) from the controller 1210 through the channels 1220 and 1220. These changes received through the channel 1215 include the flow entries. The changes received through the channel 1220 include configuration information.

At stage 1201, a change 1-1 has been received through the primary channel 1215. Changes 2-1 and 2-2 have been received through the secondary channel 1220. The managed forwarding element has stored these changes in a storage structure 1230 but has not started using these changes to forward incoming packets (not shown) because the managed forwarding element 1205 has not received a complete transaction through the primary channel 1215. The managed forwarding element forwards the incoming packets using the current forwarding state.

The first stage 1201 also shows that a change 1-2 is coming to the managed forwarding element 1205 through the primary channel 1215 and a change 2-3 is coming to the managed forwarding element 1205 through the secondary channel 1220. The change 2-3 is depicted as a parallelogram with bold border to indicate that the change 2-3 is the last change of a transaction received through the secondary channel 1220 that includes the changes 2-1, 2-2, and 2-3.

At the second stage 1202, the managed forwarding element 1205 has received the changes 1-2 and 2-3 through the primary channel 1215 and the secondary channel 1220, respectively. The managed forwarding element 1205 has stored the changes 1-2 and 2-3 in the storage structure 1230 but has not started using these changes to forward incoming packets and configure the managed forwarding element 1205 because the managed forwarding element 1205 has not yet received a complete transaction through the primary channel 1215.

The second stage 1202 also shows that a change 1-3 is coming to the managed forwarding element 1205 through the primary channel 1215. The change 1-3 is depicted as a parallelogram with bold border to indicate that the change 1-3 is the last change of a transaction received through the secondary channel 1215 that includes the changes 1-1, 1-2, and 1-3.

At the third stage 1203, the managed forwarding element 1205 has received the change 1-3 through the primary channel 1215 and thus has completely received a transaction from the primary channel 1215. The managed forwarding element 1205 thus updates the forwarding state with the changes received through the channels 1215 and 1220 in two transactions.

The fourth stage 1204 shows that the changes are committed by the managed forwarding element 1205. That is, the managed forwarding element 1205 uses the updated forwarding state to forward incoming packets and configure the managed forwarding element 1205. In this manner, the managed forwarding element 1205 has nested the transactions received through the secondary channel into the transaction received through the primary channel in order to achieve a global transaction across the two channels.

Figure 13:
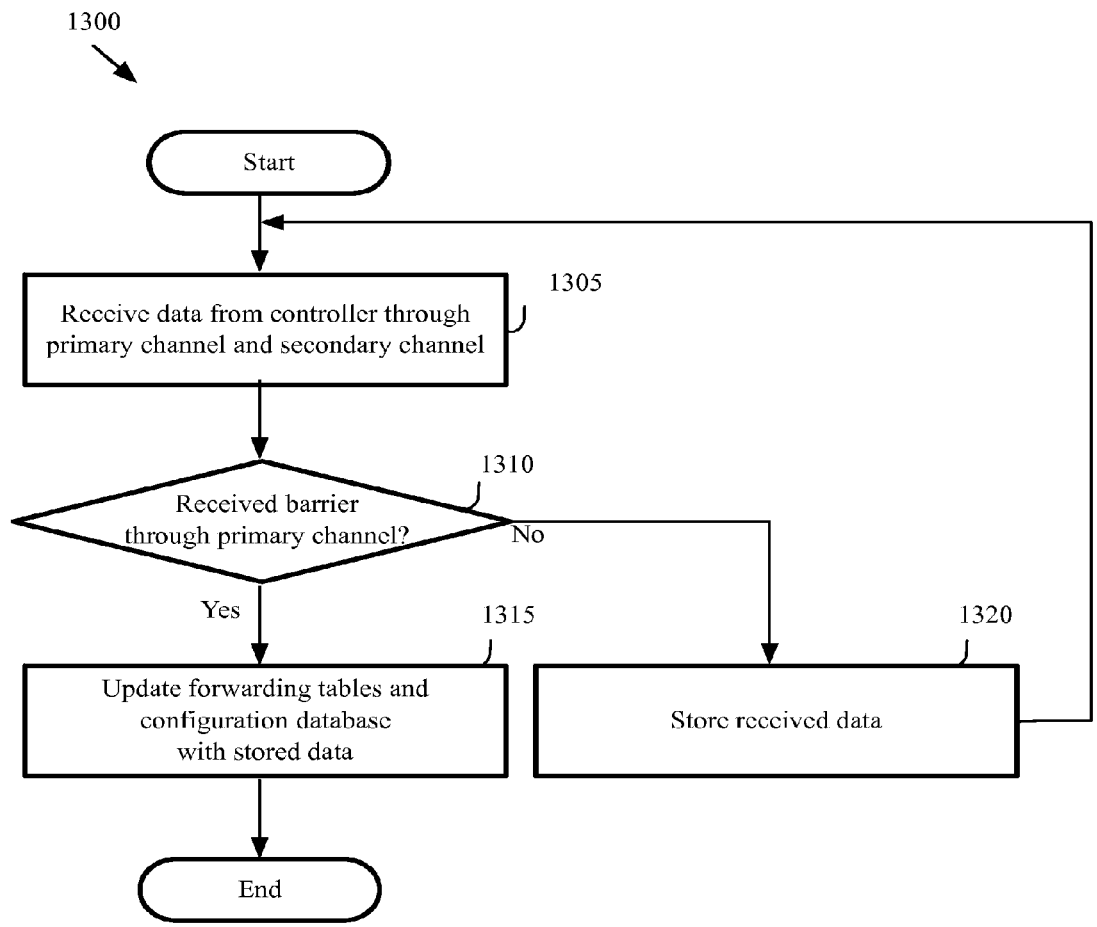
FIG. 13 conceptually illustrates a process that some embodiments perform to batch transactions received through a set of secondary channels into a transaction received through a primary channel.

FIG. 13 conceptually illustrates a process 1300 that some embodiments perform to batch transactions received through a secondary channel into a transaction received through a primary channel. The process 1300 of some embodiments is performed by a managed forwarding element (e.g., the managed forwarding element 1205 of FIG. 12) that receives forwarding state from a controller through several channels established to the controller. The controller may be a physical controller that is a master of the managed forwarding element or a chassis controller that operates in the same host in which the managed forwarding element operates. In some embodiments, one of the channels is designated as a primary channel and the other channel is designated as a secondary channel.

The process 1300 begins by receiving (at 1305) forwarding state through the primary and secondary channels. In some embodiments, the forwarding state received from the controller through the channels includes CPCP data. Specifically, the forwarding state that comes through the primary channel includes control data that goes to the control plane of the managed forwarding element. The forwarding state that comes through the secondary channel includes configuration data (e.g., data for configuring ingress ports, egress ports, QoS configurations for ports, middlebox instances, etc.). In some embodiments, however, designation of the primary and secondary channels do not have to depend on the type of data received through the channels, as long as one of the channels is designated as a primary channel and the other channel is designated as a secondary channel.

Next, the process 1300 determines (at 1310) whether the process 1300 has received a barrier through the primary channel. As mentioned above, a barrier, when received at the receiving device, indicates that one transaction of inputs has been completely received by the receiving device. In some embodiments, a barrier is information added to a change. A barrier of other embodiments is a change itself that indicates the sender of the change has completely sent a set of transactional inputs.

When the process 1300 determines (at 1310) that a barrier has not been received through the primary channel, the process stores (at 1320) the forwarding state that the process so far has received in a storage structure. The forwarding state stored in the storage structure is not used by the managed forwarding element. The process 1300 then loops back to 1305 to receive more forwarding state from the controller cluster through the channels.

When the process 1300 determines (at 1310) that a barrier has been received through the primary channel, the process updates the forwarding tables and the configuration database of the managed forwarding element with the forwarding state received so far. The managed forwarding element then configures the managed forwarding element using the configuration data and starts forwarding incoming packets based on the updated flow entries in the forwarding tables. The process 1300 then ends.

It is to be noted that the generalization allows for nesting the transactions to arbitrary depths, if so needed. In particular, a transactional system may internally construct its transactionality out of nested transactions. The ability to construct the transactionality out of nested transactions comes useful not only in the hierarchical structure that the controllers may form, but also in considering how the forwarding elements may internally provide a transactional interface for the controllers managing the forwarding elements.

The network control system of some embodiments introduces transactionality to a communication channel without any explicit support for transactionality in the underlying managed resource, again by using the same principle of nesting. Consider a path with an easily extendable table pipeline. Even if the flow table updates did not support transactions, it is easy to add a stage to the front of the existing pipeline and have a single flow entry decide which version of the state should be used. Hence, by then updating a single flow entry (which is transactional), the whole flow table can be updated transactionally. The details of this approach do not have to be exposed to the controllers above; however, effectively there is now a hierarchy of transactions in place.

As a use case of the embodiments described above, a migration from a controller version to another controller version (i.e., software versions) benefits from the transactions and fixed point computation support in the system. In this use case, an external upgrade driver runs the overall upgrade process from one controller version to another. It is the responsibility of that driver to coordinate the upgrade to happen in a way that packet loss does not occur.

The overall process that the driver executes to compose a single global transaction of smaller sub-transactions is as follows:

(1) Once a need for upgrading the forwarding state is required, the driver asks for the computation of the new state for the network middle (fabric) to start. This is done for all the controllers managing the network middle state, and the new middle state is expected to co-exist with the old one.

(2) The driver then waits for each controller to reach a fixed point and then commits the transaction, synchronously downwards to the receiving controllers/switching elements. The driver does the committing in a synchronous manner because after the commit the driver knows the state is active in the switching elements and is usable by the packets.

(3) After this, the driver asks for the controllers to update towards the new edge forwarding state that will also use the new paths established in (1) for the middle parts of the network.

(4) Again, the driver asks for the fixed point from all controllers and then once reaching the fixed point, also synchronously commits the updates.

(5) The update is finalized when the driver asks for the removal of the old network middle state. This does not need to wait for fixed point and commit; the removal will be pushed down with any other changes the controllers will eventually push down.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
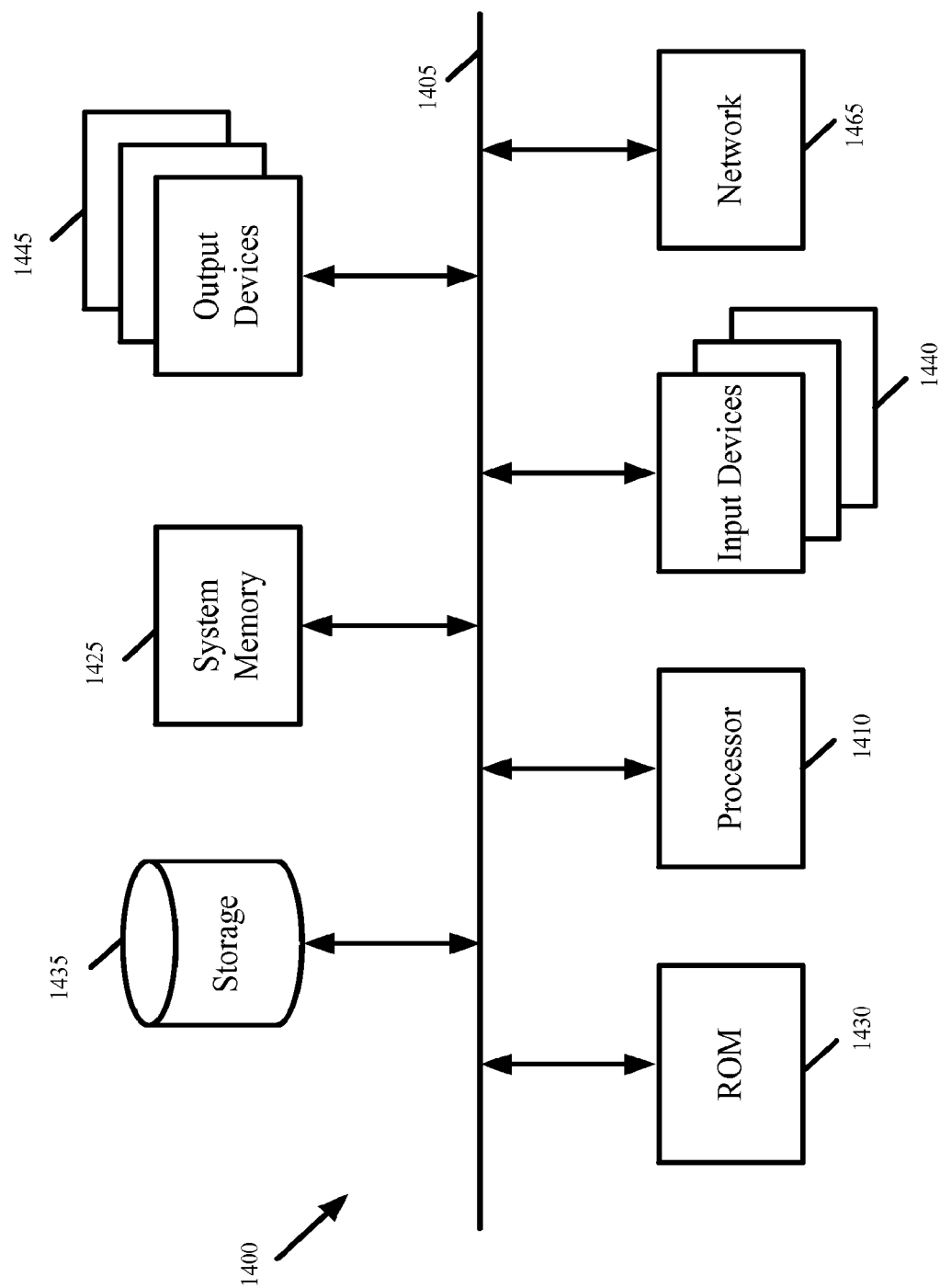
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9, 6, 10, 7, 11, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method for a network controller that distributes configuration data to a managed forwarding element in order to configure the managed forwarding element to forward data in a network, the method comprising:

receiving a set of input configuration data of a transaction comprising a plurality of sets of input configuration data;

determining whether the set of input configuration data has external dependencies that require additional data specific to the managed forwarding element;

when the set of input configuration data has external dependencies:

computing a first set of incomplete output configuration data based on the set of input configuration data;

distributing the first set of output configuration data to the managed forwarding element as a request for the additional data specific to the managed forwarding element; and computing a second set of output configuration data based on the set of input configuration data and a response to the request for the additional data from the managed forwarding element; and upon determining that output configuration data for all of the plurality of sets of input configuration data of the transaction has been computed, distributing the second set of output configuration data to the managed forwarding element.

2. The method of claim 1 wherein, when the set of input configuration data does not have external dependencies, the network controller computes a third set of output configuration data based on the set of input configuration data.

3. The method of claim 1, wherein the network controller is a first network controller, wherein the received set of input configuration data is received from a second network controller.

4. The method of claim 1, wherein the output configuration data for the transaction comprises an indicator that indicates that, when received by the managed forwarding element, the transaction has been completely received at the managed forwarding element.

5. The method of claim 1, wherein the managed forwarding element is a software forwarding element, wherein the software forwarding element and the network controller operate on a single host machine.

6. The method of claim 1, wherein computing the sets of output configuration data comprises performing table mapping operations on the sets of input configuration data.

7. The method of claim 1, wherein determining whether the set of input configuration data has external dependencies comprises determining whether the input configuration data requires a change at the managed forwarding element.

8. The method of claim 7, wherein the change at the managed forwarding element is creation of a tunnel port.

9. The method of claim 1, wherein the external dependencies of the set of input configuration data require a change to a current configuration of how the managed forwarding element forwards data in the network, wherein the first set of output configuration data comprises configuration data specifying the configuration change.

10. The method of claim 1, wherein the additional data specific to the managed forwarding element comprises a port number of the managed forwarding element used to forward packets.

11. A non-transitory machine readable medium storing a program for a network controller which when executed by a set of processing units distributes configuration data to a managed forwarding element in order to configure the managed forwarding element to forward data in a network, the program comprising sets of instructions for:

receiving a set of input configuration data of a transaction comprising a plurality of sets of input configuration data;

determining whether the set of input configuration data has external dependencies;

when the set of input configuration data has external dependencies:
- computing a first set of output configuration data based on the set of input configuration data;
- distributing the first set of output configuration data to the managed forwarding element as a request for additional data; and
- computing a second set of output configuration data based on the set of input configuration data and a response to the request for additional data from the managed forwarding element; and upon determining that output configuration data for all of the plurality of sets of input configuration data of the transaction has been computed, distributing the second set of output configuration data to the managed forwarding element.

12. The non-transitory machine readable medium of claim 11, wherein the program further comprises a set of instructions for, when the set of input configuration data does not have external dependencies, computing a third set of output configuration data based on the set of input configuration data.

13. The non-transitory machine readable medium of claim 11, wherein the network controller is a first network controller, wherein the received set of input configuration data is received from a second network controller.

14. The non-transitory machine readable medium of claim 11, wherein the output configuration data for the transaction comprises an indicator that indicates that, when received by the managed forwarding element, the transaction has been completely received at the managed forwarding element.

15. The non-transitory machine readable medium of claim 11, wherein the managed forwarding element is a software forwarding element, wherein the software forwarding element and the program for the network controller operate on a single host machine.

16. The non-transitory machine readable medium of claim 11, wherein the set of instructions for computing the sets of output configuration data comprises a set of instructions for performing table mapping operations on the sets of input configuration data.

17. The non-transitory machine readable medium of claim 11, wherein the set of instructions for determining whether the set of input configuration data has external dependencies comprises a set of instructions for determining whether the input configuration data requires a change at the managed forwarding element.

18. The non-transitory machine readable medium of claim 17, wherein the change at the managed forwarding element is creation of a tunnel port.

19. The non-transitory machine readable medium of claim 11, wherein the set of instructions for determining whether the set of input configuration data has external dependencies comprises a set of instructions for determining whether the set of input configuration data requires a change to a current configuration of how the managed forwarding element forwards data in the network.

20. The non-transitory machine readable medium of claim 11, wherein the configuration data comprises flow entries for managing the data in the network at the managed forwarding element.

* * * * *